United States Patent [19]

Adams, Jr.

[11] Patent Number: 5,375,193
[45] Date of Patent: Dec. 20, 1994

[54] METHOD AND APPARATUS FOR REPRODUCING BLENDED COLORANTS ON AN ELECTRONIC DISPLAY

[75] Inventor: Louis W. Adams, Jr., Spartanburg, S.C.

[73] Assignee: Milliken Research Corporation, Spartanburg, S.C.

[21] Appl. No.: 176,615

[22] Filed: Jan. 3, 1994

Related U.S. Application Data

[62] Division of Ser. No. 859,339, Mar. 27, 1992.

[51] Int. Cl.$^5$ .............................................. G06F 15/62
[52] U.S. Cl. ...................................... 395/131; 348/33
[58] Field of Search .................... 395/131; 345/72, 88, 345/153, 120, 138; 348/33, 34, 582

[56] References Cited

U.S. PATENT DOCUMENTS

| | | | |
|---|---|---|---|
| 4,159,892 | 7/1979 | Blumenaus | 8/62 |
| 4,188,216 | 2/1980 | Blumenaus | 430/22 |
| 4,232,366 | 11/1980 | Levy et al. | 364/200 |
| 4,635,078 | 1/1987 | Sakurada et al. | 346/140 |
| 4,654,721 | 3/1987 | Goertzel et al. | 358/283 |
| 4,680,645 | 7/1987 | Dispoto et al. | 358/298 |
| 4,721,943 | 1/1988 | Stallkamp | 345/22 |

(List continued on next page.)

OTHER PUBLICATIONS

Ricardo J. Motta and Roy S. Berns, *The Colorimetric Calibration of a CRT Imaging System for Color Appearance Research*, Munsell Color Science Laboratory.
Franc Grum and C. James Bartleson, *Optical Radiation Measurements*, vol. 2, Color Measurement, Academic Press, 1980.
Eric Walowit, Cornelius J. McCarthy, and Roy S. Berns, *Spectrophotometric Color Matching Based on Two-Constant Kubelka-Munk Theory*, pp. 358-362, 1988, John Wiley & Sons, Inc.
Paul H. Hoffenberg, Applied Color Systems, Inc., *A Mathematical Model And Algorithm For Commercial Color Matching Software Based On Single-Constant Kubelka-Munk Theory*, pp. 208-217.
Stanley E. Orchard, *The Missing Variable: Internal Surface Reflection*, Color Research and Applications 2 No. 1, 26 (1977).
James H. Nobbs, *Kubelka-Munk Theory and the Prediction of Reflectance*, Rev. Prog. Coloration 15, 66 (1985).
Fred W. Billmeyer, Jr. and L. Willard Richards, *Scattering and Absorption of Radiation by Lighting Materials*, Journal of Color & Appearance, vol. II, No. 2, Summer 1973, pp. 1-15.
Fred W. Billmeyer, Jr. and Richard L. Abrams, *Predicting Reflectance and Color of Paint Films by Kubelka-Munk Analysis*, J. Paint Technology 45 No. 579, 23 (1973).

(List continued on next page.)

Primary Examiner—Mark R. Powell
Assistant Examiner—Huynh Ba
Attorney, Agent, or Firm—Kevin M. Kercher; Terry T. Moyer

[57] ABSTRACT

An apparatus and method for reproducing the color of blended colorants on an electronic display such as a cathode ray tube, liquid crystal display or other type of electronic device that utilizes RGB values. Predictions of blended colorants on or in substrates can be made from XYZ measurements of samples prepared with no colorants, one colorant, and pairs of colorants. The calculation method uses light absorption, light scattering, and light absorption blend coefficients. An image digitizer can be used to obtain XYZ values from samples. Furthermore, image digitizer RGB values are converted into XYZ values with a non-linear model using a simple method. Furthermore, the above process to generate XYZ values from image digitizer RGB values can be used to generate RGB values from XYZ values for electronic display.

64 Claims, 8 Drawing Sheets

U.S. PATENT DOCUMENTS

| | | |
|---|---|---|
| 4,733,230 | 3/1988 | Kurihara et al. ............... 345/138 |
| 4,758,897 | 7/1988 | Hiratsuka et al. .............. 358/283 |
| 4,807,182 | 2/1989 | Queen .............................. 364/900 |
| 4,811,108 | 3/1989 | Numakura et al. ............. 358/298 |
| 4,823,108 | 4/1989 | Pope ................................ 345/120 |
| 4,833,623 | 5/1989 | Archer et al. ................... 364/507 |
| 5,150,199 | 9/1992 | Shoemaker et al. ........... 358/21 R |

OTHER PUBLICATIONS

P. S. Mudgett and L. W. Richards, *Multiple Scattering Calculations for Technology II*, J. Colloid and Interface Science 3 No. 3 (1972).

P. S. Mudgett and L. W. Richards, *Multiple Scattering Calculations for Technology II*, Journal of Colloid and Interface Science, vol. 39, No. 3, Jun. 1972.

Eugene Allen, *Colorant Formulation and Shading*, Optical Radiation Measurements, vol. 2: Color Measurement, 289 (Academic Press, 1980).

David L. Post and Christopher S. Calhoun, *An Evaluation of Methods for Producing Desired Colors on CRT Monitors*, COLOR Research and Application, vol. 14, No. 4, Aug. 1989, pp. 178–186.

William B. Cowan, *An Inexpensive Scheme for Calibration Of A Colour Monitor In Terms Of CIE Standard Coordinates*, Computer Graphics, vol. 17, No. 3, Jul. 1983, pp. 315–321.

Marcel P. Lucassen and Jan Walraven, *Evaluation of a Simple Method for Color Monitor Recalibration*, COLOR Research and Application, vol. 15, No. 6, Dec. 1990, pp. 321–326.

William Cowan, *Colorimetric Properties of Video Monitors*, Annual Meeting of of the Optical Society of America, Rochester, Oct. 1987.

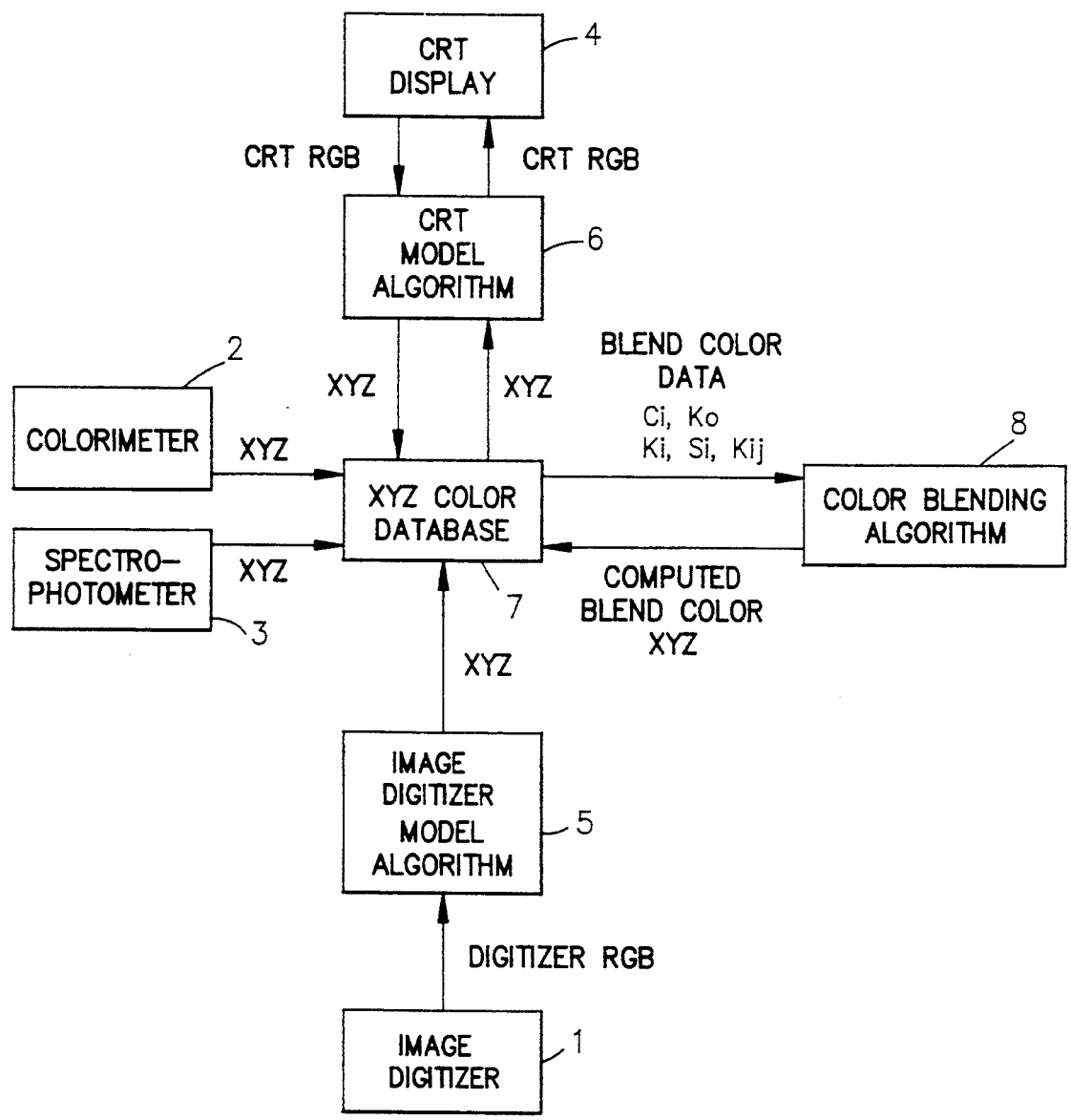
FIG. —1—

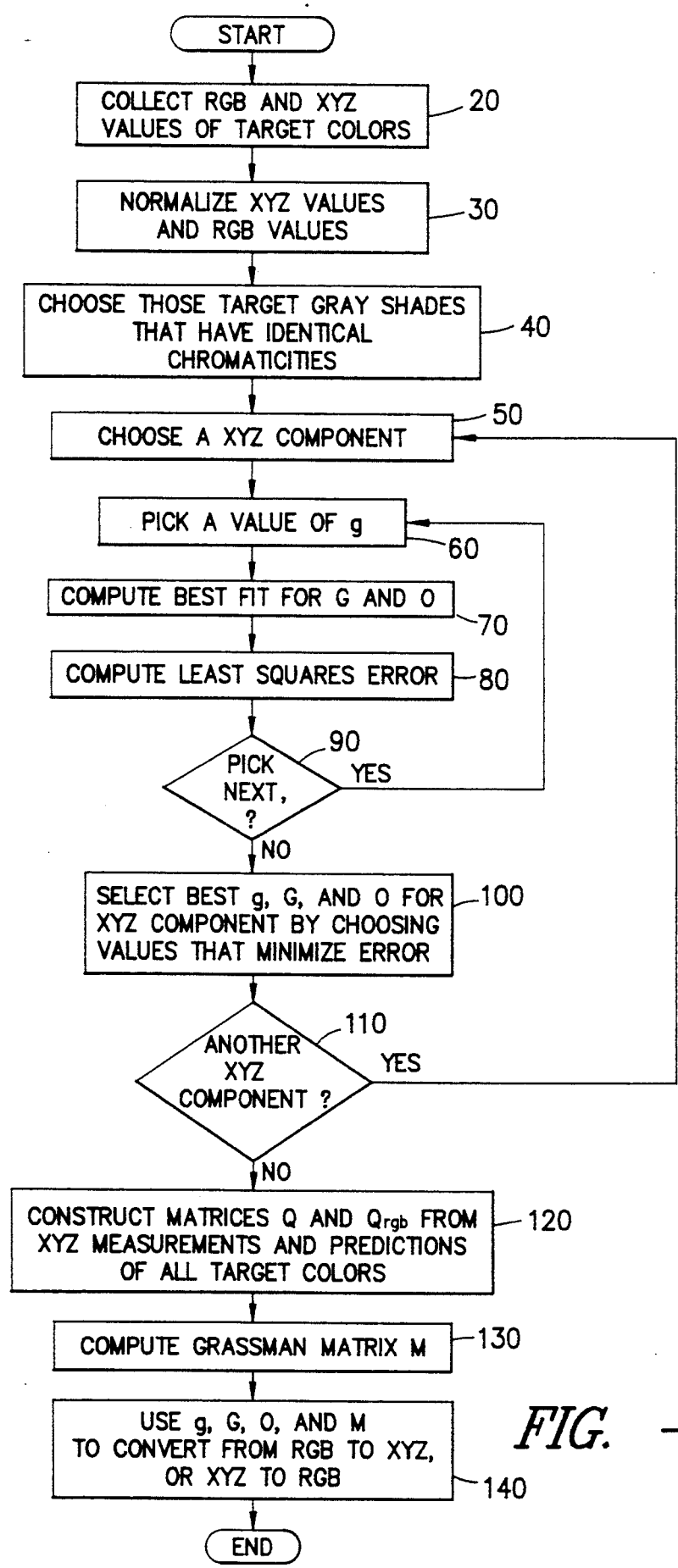
FIG. -2-

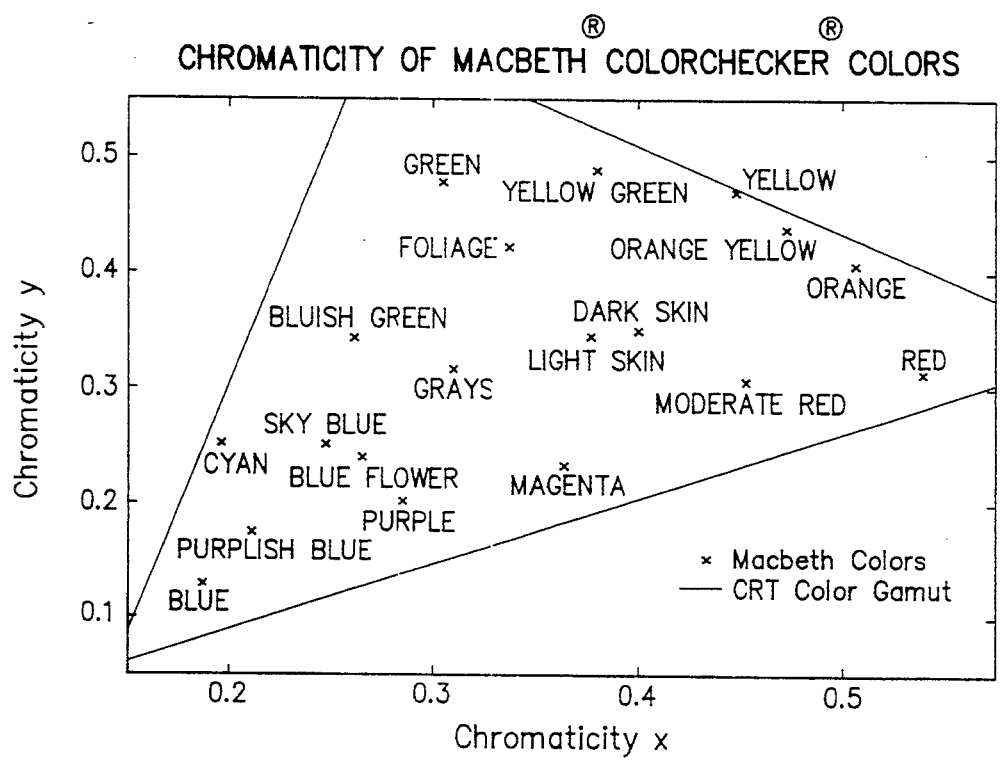
FIG. —3—
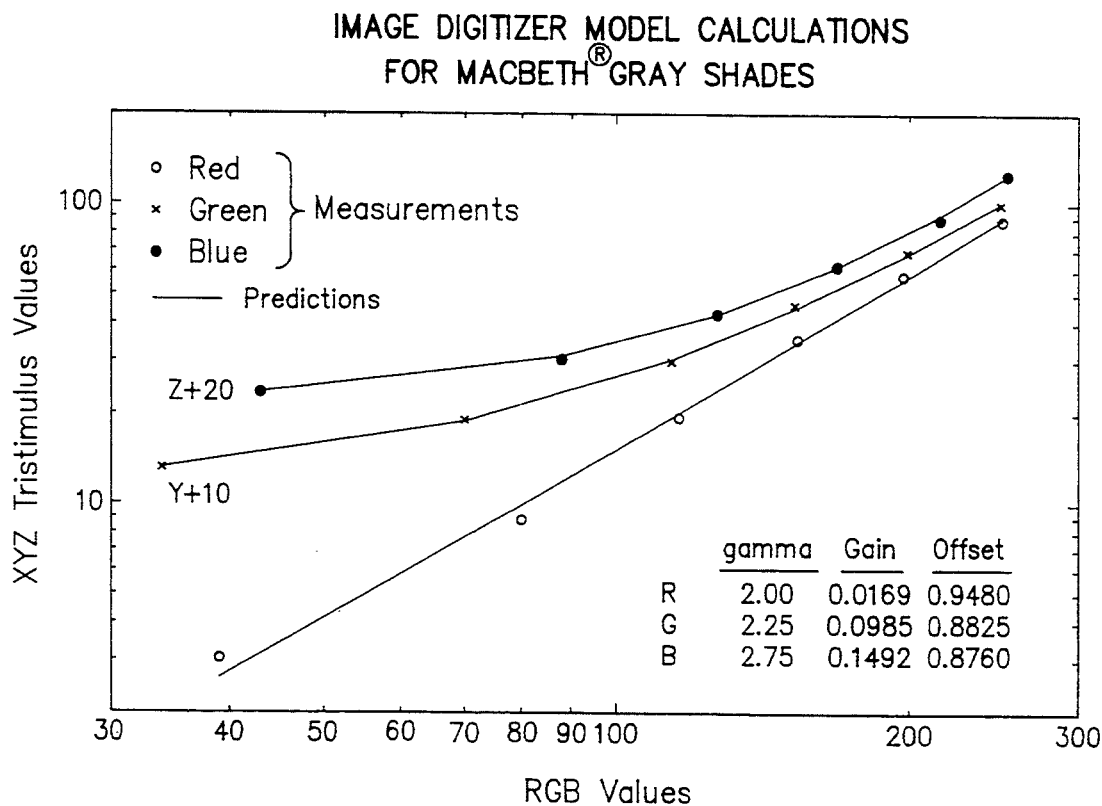
FIG. —4—

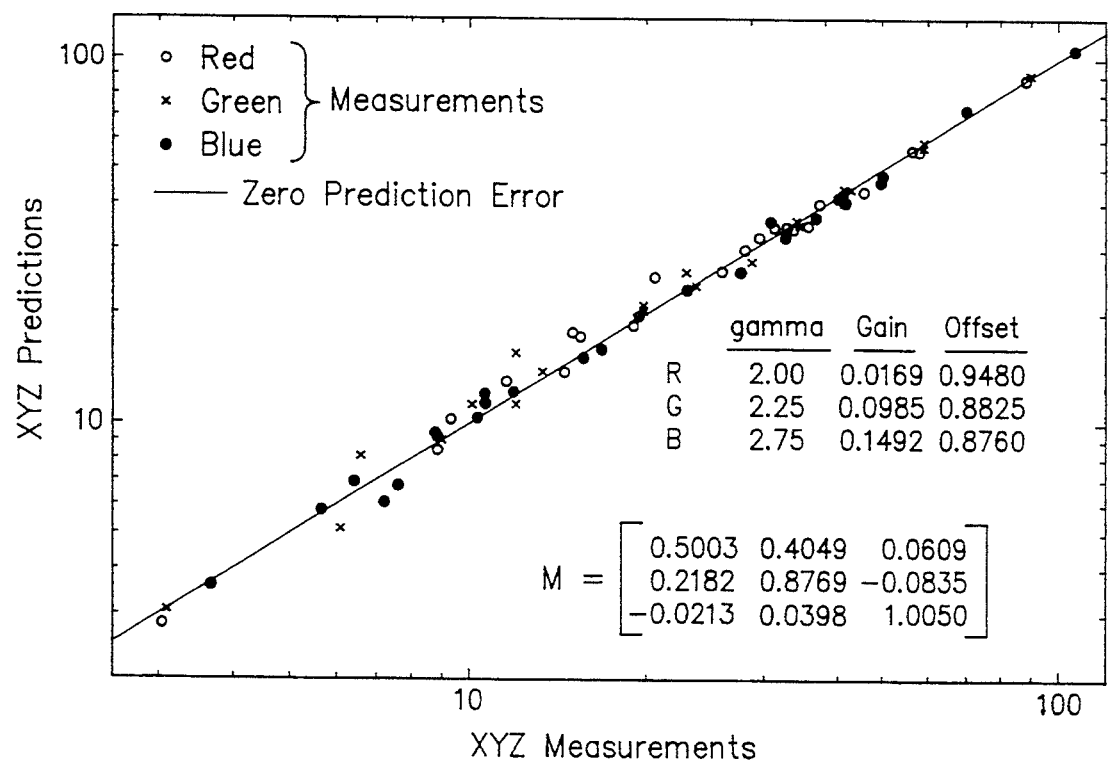
FIG. —5—

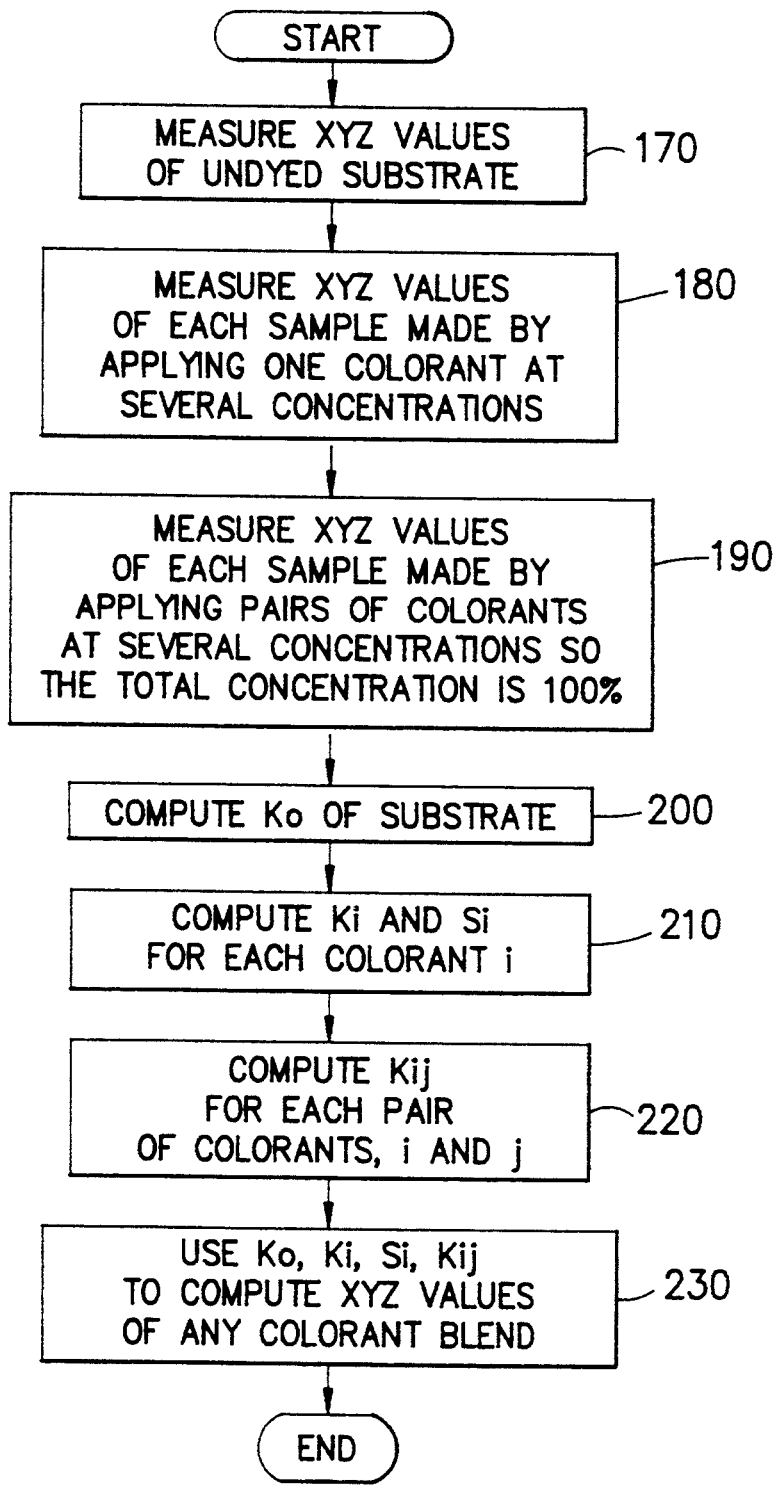
FIG. —6—

STAGED REGRESSION STEPS FOR DYE BLEND CALCULATIONS
STEP 1: Measure Samples
C1: Concentration fo Dye 1
C2: Concentration of Dye 2
    C1+C2=100%
R: Scaled XYZ Values
$$\frac{K}{S} = \frac{(1-R)^2}{2R}$$
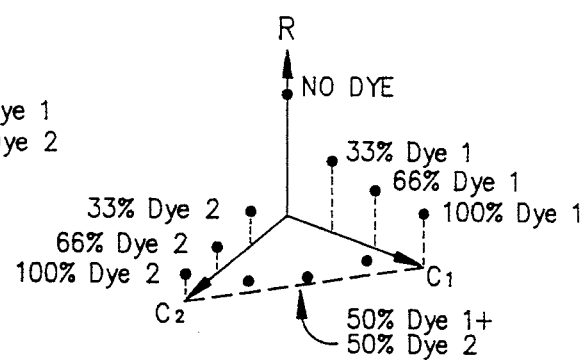
STEP 2: Fit Zero-Dye Measurement
$$\frac{K}{S} = K_0$$
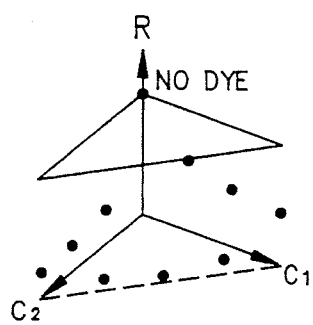
STEP 3: Fit One-Dye Measurements
$$\frac{K}{S} = \frac{K_0 + K_1 * C_1 + K_2 * C_2}{1 + S_1 * C_1 + S_2 * C_2}$$
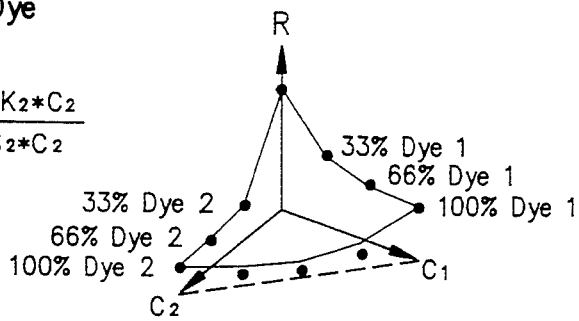
STEP 4: Fit Two-Dye Measurements
$$\frac{K}{S} = \frac{K_0 + K_1 * C_1 + K_2 * C_2 + K_{12} * C_1 * C_2}{1 + S_1 * C_1 + S_2 * C_2}$$
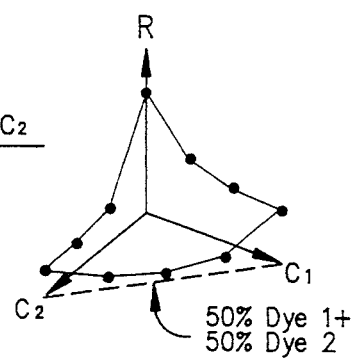
*FIG. —7—*

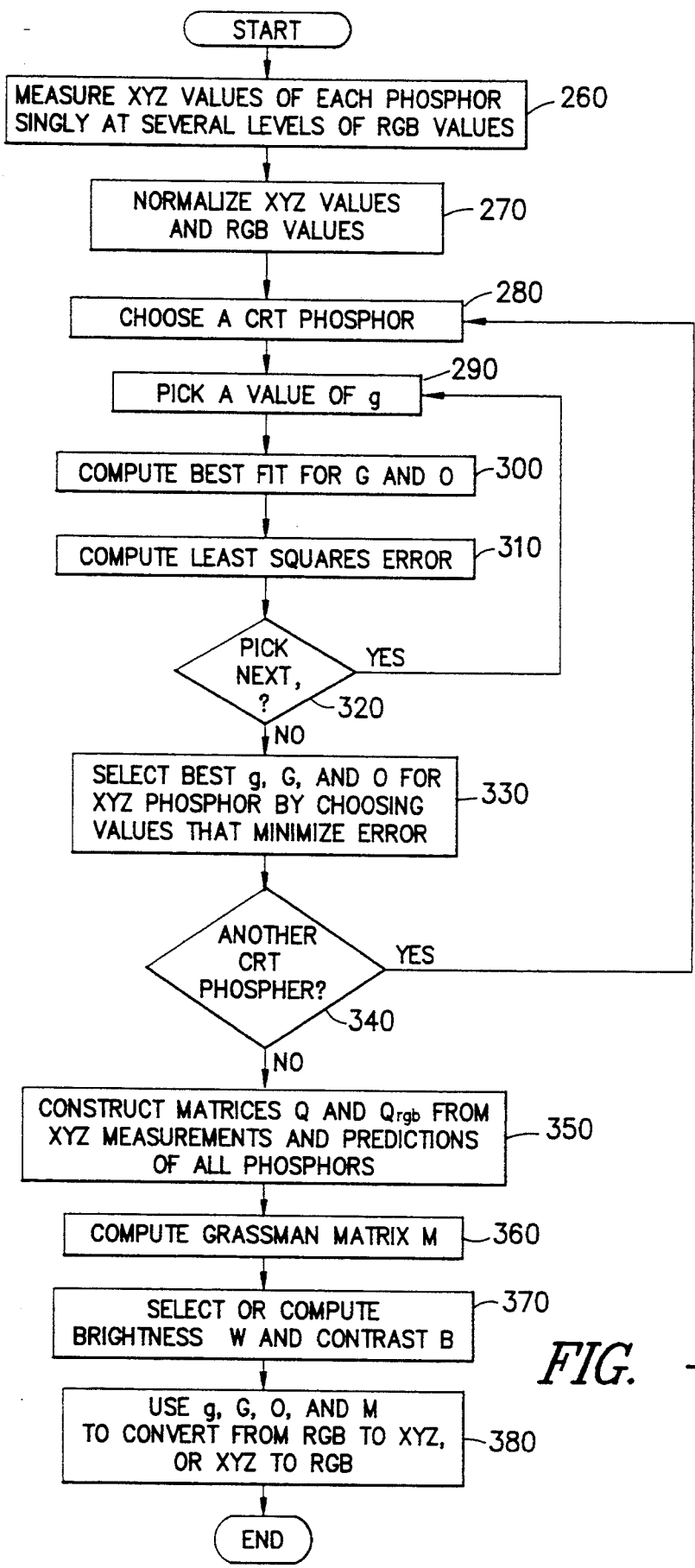
FIG. -8-

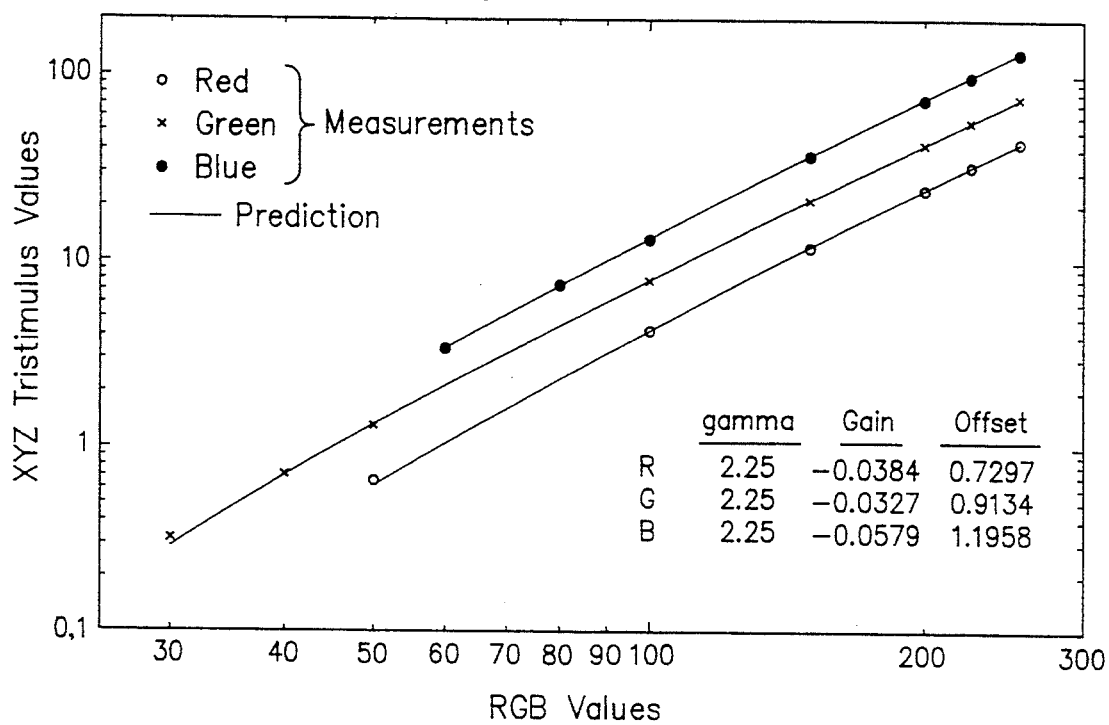
FIG. -9-
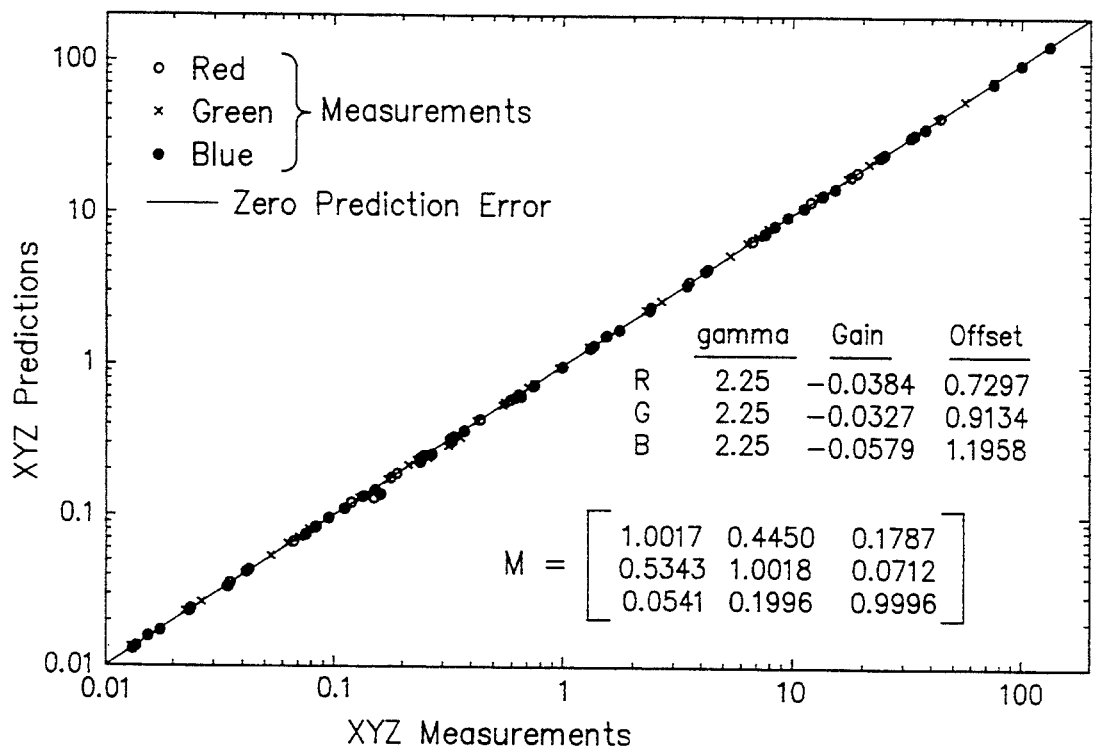
FIG. -10-

METHOD AND APPARATUS FOR REPRODUCING BLENDED COLORANTS ON AN ELECTRONIC DISPLAY

This is a division of application Ser. No. 07,859,339 filed Mar. 27, 1992 for METHOD AND APPARATUS FOR REPRODUCING BLENDED COLORANTS ON AN ELECTRONIC DISPLAY.

BACKGROUND OF THE INVENTION

This invention relates to a method and apparatus for reproducing the color of blended colorants on an electronic display.

The most accurate ways of computing color formulation are either very difficult to use, or computationally impractical. The most successful simple mathematical theory for predicting the color of mixtures is the Kubelka-Munk Model. For some applications, the model is overly simplistic. The Kubelka-Munk Model assumes light falls exactly perpendicular onto a perfectly flat media containing the colorants. The colorants must be perfectly mixed into the substrate media, and the resulting colored substrate must be isotropic. The index of refraction of the media and colorants is assumed to be the same as air, so internal and external specular reflection and refraction are ignored.

Assume these conditions are met, and the substrate is optically thick. In this case, Kubelka-Munk Theory predicts the following simple relationship: $K/S=(1-R)^2/2R$. K and S are physical properties of the colored media. R is the measured color. The relationship expressed by the equation holds at each wavelength of light in the visible spectral band. R denotes the fraction of light reflected by the sample. K and S are light absorption and light scattering coefficients of the colorant mixture, respectively. It is more convenient to deal with K/S rather than R. This is because the physical properties of a mixture (K and S) are, to a good approximation, proportional to the physical properties of each colorant in the mixture, namely the corresponding coefficients $K_i$ and $S_i$ of colorant i. The proportionality constants are component concentrations $C_i$. Therefore, for simple colorant formulation calculations, one assumes for N colorants that $K=K_1C_1+K_2C_2+\ldots K_NC_N$ and $S=S_1C_1+S_2C_2+\ldots S_NC_N$. As before, these equations hold at each wavelength of light. By inverting the earlier formula ($K/S=(1-R)^2/2R$) that connects K/S to R, and by using the above equations connecting K and S to $K_i$ and $S_i$, a connection is obtained between colorant concentrations $C_i$ and measured color R. Values of absorption and scattering coefficients of colorants are typically extracted from least squares calculations involving sample color measurements.

For applications requiring a high degree of accuracy, this simple Kubelka-Munk Theory must be modified. Corrections for substrate surface reflection, internal refraction, and colorant interactions are necessary. Sometimes it is necessary to extend spectral measurements into the ultraviolet to deal with colorant fluorescence. The texture of some targets (e.g., textiles) have a gloss that cannot be easily subtracted by measurement or compensated for by mathematical modeling. This means computed values for $K_i$ and $S_i$ must be cautiously interpreted, and perhaps further modified, before subsequent colorant formulation predictions are accurate.

In computer aided design (CAD), visual feedback is desirable during color formulation. One way to do this is to simulate a product on an electronic display. Performing Kubelka-Munk calculations, with the corrections noted above, involves a great deal of computation. Spectral data at many wavelengths must be stored on computer. Color measurements are traditionally made with spectrophotometers. These devices are relatively expensive and require uncommon technical expertise to operate. The usual way of converting spectral data into color coordinates appropriate for electronic display involves complex nonlinear equations. Computer aided design is one example of an application where color precision requirements are less demanding than, say, textile dye formulation. The present invention solves these problems, in a manner not disclosed in the known prior art, for less demanding applications.

SUMMARY OF THE INVENTION

This Application discloses an apparatus and method for reproducing blended coloration of samples on an electronic display. The electronic display can be a cathode ray tube, liquid crystal display, or other type of electronic display utilizing red, green, and blue (RGB) color coordinates. We usually assume colorants are blended and not merely placed on the substrate in side-by-side relation. Colorants can be applied in layers, if the colorants are mostly transparent, not very opaque. Color image digitizers are commonly used during some kinds of computer aided design. We show how color image digitizers, less expensive than traditional color measurement equipment, can be used to obtain color measurements. This invention is for simulation work only and cannot be used for critical colorant formulation work.

We choose CIE XYZ tristimulus color coordinates for color analysis. Instead of measurements over many different wavelengths, tristimulus color measurements X, Y, and Z, are averages over red, green, and blue spectral bands, respectively. This is the minimum spectral information required to quantify color, since color vision provides the brain with red, green and blue spectral band averages via retina cone cells. And, this is why electronic displays use three-color light emission systems; e.g., CRT color monitors use red, green, and blue phosphors. Devices that measure color at many wavelengths (such as spectrophotometers and radiometers) compute XYZ values from appropriate weighted averages in the red, green, and blue spectral bands. Devices such as colorimeters, color luminance meters, and desktop image digitizers are less expensive because XYZ values are directly measured using three color optical filters. Each filter performs the appropriate spectral band averages directly. That is, color is measured essentially at only three or four wavelengths for these latter devices.

Whenever possible, a color image digitizer is preferable to a colorimeter because it is less expensive and requires less technical expertise to operate. Color image digitizer operation can be more easily incorporated into an application than devices like spectrophotometers. A color image digitizer is also more likely to be considered necessary for other activities, such as image acquisition.

Color image digitizers are less accurate than full spectrum measurement devices, but we are only considering applications where high accuracy is unnecessary. For example, visual feedback for CRT color monitor imagery requires less accuracy than, say, product color quality control in a manufacturing operation. Human color vision is very accommodating to systematic deviations from color accuracy.

The use of XYZ values violates Kubelka-Munk Model assumptions because the derivation treats radiation scattering at each wavelength. Weighted averages of wavelengths have no physical meaning in the model. Using XYZ values in the Kubelka-Munk Model leads to incorrect predictions for colorant mixtures. It is necessary to add additional terms to the model to achieve satisfactory predictions. The previously stated equations for K and S contain terms of the form $K_i C_i$ and $S_i C_i$. We discovered that it is sufficient to add terms of the form $K_{ij} C_i C_j$ to the equation for K. We refer to the coefficients $K_{ij}$ as light absorption blend coefficients for colorants i and j. It is not necessary to add similar terms to S. These new coefficients are generally not related to molecular interactions between colorants in the mixing media, although the addition of these terms might better accommodate such interactions when present. In this invention, least squares fitting to our modified Kubelka-Munk equations partially compensates for factors such as specular reflection, non-smooth surfaces (e.g., textiles), the use of tristimulus color measurements, and other factors not included in simple Kubelka-Munk Theory.

If colorants are applied in thin layers on a substrate, rather than well mixed into a substrate, our technique can also successfully predict colors. If colorants are mostly transparent, and not very opaque, then one can use the term $K_{ij} C_i C_j$ in calculations when colorant j is applied to colorant i, and use the term $K_{ji} C_i C_j$ when colorant i is applied to colorant j. $K_{ij}$ and $K_{ji}$ will differ in value to a degree that correlates with colorant opacity. Clearly, a light colorant applied to a dark colorant will appear lighter than a dark colorant applied to a light colorant, in general. For the remainder of this Application, we assume this distinction is not necessary to simplify the Application. When colorants well mixed, then $K_{ij}$ equals $K_{ji}$, whether or not colorants are opaque.

The first step necessary to compute absorption and scattering coefficients is to gather sample measurements. We measure X, Y, Z tristimulus color measurements from an uncolored substrate. (All of the samples discussed below must be prepared using the same type of substrate. In applications where substrates are different, each substrate must be treated as a separate case). Then X, Y, Z tristimulus color measurements are made from samples with different concentrations of one colorant. This is done for all colorants to be blended, and concentrations must span the practical limit of concentrations. Finally, X, Y, Z tristimulus color measurements are made from samples utilizing pairs of colorants at several concentrations so that the sum of the blend concentrations is some fixed limit, stated in relative terms as 100%. All concentrations in this Application are expressed as a percentage. This relative scale must be based on some absolute physical measurement, such as colorant weight or volume.

The total concentration limit is usually due to some physical constraint on the colorant application process. For example, the amount of a colorant that can diffuse into a textile polymer has an upper limit. Small extrapolations beyond 100% are predicted satisfactorily in instances where the practical limit chosen for manufacturing purposes is less than the actual physical limit.

Now we begin to utilize the measurements obtained in the first step. The second step is to compute the light absorption coefficient $K_o$ for the uncolored substrate using measurements from the uncolored substrate. The third step is to utilize the measurements from the substrate colored by a single colorant to compute the light absorption coefficients $K_i$ and light scattering coefficients $S_i$ for colorant i. The final step utilizes the two-colorant blend measurements to compute the light absorption blend coefficient $K_{ij}$ for each pair of colorants i and j. All of these coefficients are computed for the X, Y, and Z (red, green, and blue) spectral bands. We have discovered that it is not necessary to extend the model to higher order terms. There is no $S_o$ term for the colorant substrate, because in our procedure this substrate light scattering term is factored into the other coefficients.

$K_o$, $K_i$, $S_i$, and $K_{ij}$ represent coded summaries of all the sample measurements. Less computer resources are necessary to store these coefficients than is necessary to store the measurements used to obtain the coefficients. These stored coefficients comprise a compact database for color prediction. Least squares fitting eliminates sample measurement variability from future calculations. This means using the coefficients to compute a color gradient always produces a visually uniform color series. These are important advantages over interpolation schemes based on many color measurements, when such a method is unwarranted.

Once the coefficients are used to compute K/S values for arbitrary blends, which in turn is converted into color as XYZ values, these XYZ values can be used to compute RGB color coordinates used to show the blends on an electronic display.

It is an advantage of this invention to predict the color of a blend of colorants on substrates without having to actually manufacture a sample with this blend of colorants.

Still another advantage of this invention is that an image digitizer can be used to convert data into standard XYZ color measurements.

Another advantage of this invention is that predicting the blend of more than two colorants does not require the manufacturing of samples with more than two colorants.

A further advantage of this invention is that specular reflection, nonsmooth surfaces (e.g., textiles), layers of mostly transparent colorants (e.g., computer hardcopy colorants), and tristimulus color measurements can be accommodated, even though these conditions are not appropriate in the traditional Kubelka-Munk model.

Yet another advantage is a unique method of converting X, Y, Z values into R, G, B values and visa versa without having to linearize their nonlinear relationship. This advantage applies to RGB values for CRT color display, and RGB values obtained from an image digitizer.

These and other advantages will be in part apparent and in part pointed out below.

BRIEF DESCRIPTION OF THE DRAWINGS

The above as well as other objects of the invention will become more apparent from the following detailed description of the preferred embodiments of the invention when taken together with the accompanying drawings, in which:

FIG. 1 is a schematic block diagram of the basic elements for reproducing blended coloration of a substrate on an electronic display;

FIG. 2 is a flowchart of the steps utilized in measuring color of a sample by means of an image digitizer;

FIG. 3 is a graph of Macbeth ® Colorchecker ® Color Rendition Chart color chromatictries comprised of six shades of gray, three additive primaries (red, green, blue), three subtractive primaries (yellow, magenta, cyan), two skin colors, and ten miscellaneous colors which collectively span most of color space, and the graph shows the gamut of chromaticities available on a CRT color monitor;

FIG. 4 is a graph of image digitizer RGB values with measured and predicted XYZ values, and image digitizer model parameters, for Macbeth ® gray shades;

FIG. 5 is a graph of measurements versus predictions for all Macbeth ® colors;

FIG. 6 is a flowchart of the steps utilized to predict colorant blends on a substrate;

FIG. 7 is a chart showing the series of four calculations necessary to compute $K_o$, $K_i$, $S_i$, and $K_{ij}$ coefficients for colorants that are dyes;

FIG. 8 is a flowchart of the steps utilized in displaying color measurements on a cathode ray tube or other RGB electronic image display;

FIG. 9 is a graph of cathode ray tube (CRT) RGB values with measured and predicted XYZ values, and CRT model parameters; and FIG. 10 is a graph of cathode ray tube measurements versus predictions for all measured phosphor colors.

DETAILED DESCRIPTION OF THE PREFERRED EMBODIMENT

Refer now to the accompanying flowcharts and graphs. FIG. 1 shows a schematic diagram of the basic elements for reproducing blended coloration on an electronic display using computer technology. Boxes in the diagram either represent computer information modules (algorithms, databases) or external measurement devices (colorimeters, spectrophotometers). Labeled arrows represent the flow of specified information between computer modules or external measurement devices.

One color measurement standard for computer aided design or manufacturing systems is the CIE XYZ tristimulus color coordinates. It is used for both color input (image digitizers, on-line colorimeters, colorant formulation databases), and color output (color monitors, color printers, colorant formulation databases). This standardized color coordinate system has been an international standard for seventy years. The use of XYZ values is increasingly being used as the basis for computerized processes involving color. Even companies with proprietary color coordinate systems that offer advantages for specific applications can usually convert their color coordinates into XYZ color coordinates. One reason for preferring XYZ values over other standard color coordinates is that they directly correspond to RGB color systems used by devices such as image digitizers and electronic displays.

XYZ values measured with a colorimeter are dimensionless, and are usually expressed as a percentage. The percent sign is customarily omitted. XYZ measurements are made with respect to some illuminant standard, such as D65 (day light at a black body temperature of 65,000° K.). These relative color values are used to quantify the color of objects that do not emit light. Percentages indicate the fraction of white light that is reflected from a target in the red, green, and blue spectral bands. Some objects emit light, such as the phosphors of a CRT color monitor. Then absolute XYZ values are measured in dimensions such as candelas per square meter or foot-Lamberts. Absolute XYZ values can be converted into relative XYZ values by scaling them with respect to some standard emitter of white light.

It is common for measurements to be expressed in terms of chromaticity x and y, and "luminance" Y. Conversion between XYZ values to xyY values is given by $x=X/(X+Y+Z)$, and $y=Y/(X+Y+Z)$. Y is the same in both coordinate systems. Chromaticity coordinates x and y are dimensionless and express the relative proportion of red and green in a color. The relative amount of blue is $z=1-x-y$. A color with equal amounts of red and green have $x=y=z=\frac{1}{3}$. Y is sometimes chosen as a measure of luminance (intensity, brightness) because human vision is more sensitive to green than red or blue. Chromaticities of common colors are shown in FIG. 3. Also shown is the chromaticity range of a typical CRT color monitor used for computer aided design.

Although color measurements are traditionally obtained from colorimeters 2 or spectrophotometers 3, or chroma meters (not shown) the preferred method in this Invention involves the use of an image digitizer 1, as shown in FIG. 1. Image digitizers like those manufactured by Sharp Electronics Corporation located at Mahwah, N.J., also have red, green, and blue receptors, or flash red, green, and blue light on samples. However, current image digitizers typically do not return XYZ values, or any other standard color coordinate system. Such devices commonly return a set of RGB values, indicating the strength of red, green, and blue. Red, green, and blue image digitizer color components are denoted as R, G, and B respectively. RGB values commonly range from 0 through 255. This Application discloses how to convert from scanner RGB values to relative XYZ values.

The image digitizer, 1 in FIG. 1, scans a sample and provides image digitizer RGB values for each measurement area in the sample. Computations upon this RGB data is performed by the Image Digitizer Model Algorithm 5. Before RGB values can be converted into XYZ values in 5, certain prerequisite measurements and calculations must be performed. In phase one of the prerequisite work, color target shades of gray having identical chromaticity xy are scanned by the image digitizer. These measurements are used to compute model parameters that are characteristic of the red, green, and blue image digitizer light measurement channels. In phase two, all of the target colors are used to compute a mixing matrix. The mixing matrix is used to convert all image digitizer RGB values into XYZ values.

A color target must be chosen for the image digitizer, to be used as described in the previous paragraph. The target must have several shades of gray with identical chromaticities. It must also have several colors that span the major color chromaticities. Very elaborate color targets are under development for color critical industries. One such color target standard is offered by the American National Standards Institute (ANSI) IT8 committee for graphic arts. Both transparent (ANSI IT8.7-1) and reflectance (ANSI IT8.7-2) targets will be offered by the major photographic film manufacturers by mid-1992. For our purposes, it is sufficient to use Macbeth ® ColorChecker ® Color Rendition Chart.

The Macbeth® ColorChecker® Color Rendition Chart has been a reliable color standard for photographic and video work for the last 15 years. The Macbeth® chart has 24 colors, as shown in TABLE 1, with chromaticity coordinates based on CIE illuminant C. Colors include six shades of gray, three additive primaries (red, green, blue), three subtractive primaries (yellow, magenta, cyan), two skin colors, and ten miscellaneous colors. Chromaticities of chart colors span most of color space, as shown in FIG. 3. FIG. 3 also shows the gamut of chromaticities available on a typical CRT color monitor.

CIE color measurements are provided by Macbeth® for each color in the Macbeth® chart, and reproduced in TABLE 1. Alternatively, a colorimeter of choice can be used to measure the Macbeth® colors. While using the measurements supplied by Macbeth® for calculations is convenient, this is not the preferred method. A standard colorimeter should be chosen for all measurements made for a computer aided design process. For example, if a HunterLab® LabScan, manufactured by Hunter Lab of Reston, Va., is used to measure all product samples, then it is preferable to measure the Macbeth® chart colors with the HunterLab® LabScan. Then the correspondence between future sample measurements and image digitizer measurements would be as close as possible. This is because different models of colorimeters, even when manufactured by the same company, often give different CIE color measurements. For example, colorimeters treat specular reflection differently. Colorimeters use different sample illumination geometries. This step of collecting RGB and XYZ values of target colors is designated as numeral 20 in FIG. 2. In this document, RGB and XYZ values are normalized so values fall between 0 and 1. This step is denoted in FIG. 2 by numeral 30.

Tristimulus values for red, green, and blue image digitizer channels are denoted $X_r$, $Y_g$, and $Z_b$, respectively, and we refer to them generically as $X_r Y_g Z_b$ values. They are defined only for gray shades having the same neutral chromaticity. They are computed from the gray shade light measurements, and are used in subsequent calculations to characterize the performance of the image digitizer light sensors. Gray shades can be provided by the Macbeth® ColorChecker®. These shades of gray all have chromaticity x=0.310 and y=0.316, and are colors 19 through 24 shown in TABLE 1.

Image digitizer parameters characterizing the non-linearity between image digitizer RGB values and XYZ values are denoted as $g_r$, $g_g$, and $g_b$, respectively. These are generically referred to as "gamma" or g.

Image digitizer parameters characterizing red, green and blue channel contrast are denoted as $G_r$, $G_g$, and $G_b$, respectively. These are generically referred to as "gain" or G.

Image digitizer parameters characterizing red, green and blue channel brightness are denoted as $O_r$, $O_g$, and $O_b$, respectively. These are generically referred to as "offset" or O.

Our choice of notation, and the terms "gamma", "gain", and "offset" derive from their original use for mathematically modeling cathode ray tube display devices.

Gain, offset and gamma parameters in the image digitizer model establish a quantitative relationship between measured color (XYZ tristimulus values) and image digitizer color components (RGB values) for the red, green, and blue image digitizer channels, as shown in the following equations:

$$X_r = (G_r + O_r \cdot R)^{g_r} \qquad \text{Eq. 1.0}$$

$$Y_g = (G_g + O_g \cdot G)^{g_g} \qquad \text{Eq. 1.1}$$

$$Z_b = (G_b + O_b \cdot B)^{g_b} \qquad \text{Eq. 1.2}$$

We now explain how to compute the image digitizer model parameters from the Macbeth® ColorChecker® color measurements. XYZ measurements values are selected for shades of gray having the same chromaticity, xy. Colors 19 through 24 (TABLE 1) are shades of gray with identical chromaticities. These are identified as the $X_r Y_g Z_b$ values. Each gray shade has corresponding image digitizer RGB values. This step is designated as numeral 40 in FIG. 2. The next step is designated as numeral 50 in FIG. 2, which is to chose whether to treat the X, Y, or Z data. Usually, one proceeds in the order X component, then Y component, and then Z component. The order is unimportant. TABLE 2 shows an example of image digitizer RGB values for Macbeth® colors. Equations 1.0, 1.1 and 1.2 are in the following form (x and y are not chromaticity variables here):

$$y = (G + O \cdot x)^g \qquad \text{Eq. 2.0}$$

Equation 2.0 can be rewritten as an equation that is linear in $y^{1/g}$. That is, a graph of x as a function of $y^{1/g}$ is a straight line.

$$y^{1/g} = G + O \cdot x \qquad \text{Eq. 2.1}$$

For specific values of g, G, and O, we define a least squares error E. A subscript m denotes individual gray shade measurements $x_m$ (representing $R_m$ or $G_m$ or $B_m$), and $y_m^{1/g}$ (representing $X_{rm}^{1/g_r}$ or $Y_{gm}^{1/g_g}$ or $Z_{bm}^{1/g_b}$). There is a total of N gray shade measurements, so m ranges from 1 to N.

$$E^2 = \sum_{m=1}^{N} \left( y_m^{\frac{1}{g}} - G - O \cdot x_m \right)^2 \qquad \text{Eq. 2.2}$$

For computational purposes, an expanded form of Equation 2.2 is preferred. Equation 2.3 is expressed in terms of summations that will already exist in prior computational steps in the final algorithm.

$$E^2 = S_{yy} - 2GS_y - 2OS_{xy} + O^2 S_{xx} + 2GOS_x + G^2 S \qquad \text{Eq. 2.3}$$

The following summation equations determine the "S" variable values.

$$S = \sum_{m=1}^{N} (1) \qquad \text{Eq. 2.4}$$

$$S_x = \sum_{m=1}^{N} (x_m) \qquad \text{Eq. 2.5}$$

$$S_{xx} = \sum_{m=1}^{N} (x_m^2) \qquad \text{Eq. 2.6}$$

$$S_y = \sum_{m=1}^{N} \left( \frac{1}{y_m^{\frac{1}{g}}} \right) \qquad \text{Eq. 2.7}$$

$$S_{yy} = \sum_{m=1}^{N}\left(y_m^{\frac{2}{g}}\right) \qquad \text{Eq. 2.8}$$

$$S_{xy} = \sum_{m=1}^{N}\left(x_m y_m^{\frac{1}{g}}\right) \qquad \text{Eq. 2.9}$$

Note the variable S found in Equation 2.4, is equal to the number of shades of gray.

Equation 2.1 is nonlinear in g. Because of this nonlinearity, our approach is not to minimize the least squares error found in Equation 2.3 for g, G, and O simultaneously. Instead, we pick a reasonable value for g, and find G and O that minimize the least squares error. The step of choosing g is designated by numeral 60 in FIG. 2. For this g, G and O are computed from by Equations 3.0, 3.1 and 3.2. This is designated by numeral 70 in FIG. 2. These equations are solutions to the least squares fit for a given value of g.

$$D = S_{xx}S - S_x^2 \qquad \text{Eq. 3.0}$$

$$G = (S_{xx}S_y - S_xS_{xy})/D \qquad \text{Eq. 3.1}$$

$$O = (-S_xS_y + S\,S_{xy})/D \qquad \text{Eq. 3.2}$$

Our chosen g and the computed optimal values for G and O can be put into Equation 2.3 to compute the least squares error E (or $E^2$) as designated by numeral 80 in FIG. 2. We then can pick another value of g, which allows us to compute another set of optimal values of G and O, that in turn gives a new least squares error. This decision to select another g is designated by numeral 90 in FIG. 2. For two choices of g, the better value is the one giving the smaller least squares error E (or $E^2$). The least squares error is not very sensitive to changes in g by differences of 0.25. The algorithm chooses values of g from 1 through 5 in increments of 0.25. As outlined above, for each g, compute G and O from Equations 2.4 through 2.9, and 3.0 through 3.2, and least squares error $E^2$ from Equation 2.3. The best value of g is the one minimizing $E^2$. This final selection of g is designated by numeral 100 in FIG. 2.

As previously stated with regard to numeral 50 of the flowchart in FIG. 2, this calculation is repeated separately for the red, green, and blue components of the gray shades. This decision step is designated by numeral 110 in FIG. 2, which will lead to repeating steps 60, 70, 80, 90 and 100 in FIG. 2 for each spectral band.

Once gamma, gain, and offset parameters are computed, Equations 1.0, 1.1, and 1.2 predict $X_r$, $Y_g$, and $Z_b$ for gray shades with chromaticities matching the original gray shades. For the Macbeth ® chart, Equations 1.0, 1.1 and 1.2 then accurately predict all shades of gray with a chromaticity equal to x=0.310, y=0.316. Equations 1.0, 1.1 and 1.2 do not by themselves accurately predict arbitrary colors.

The next step is to use measurements of arbitrary colors so we can convert image digitizer RGB values of arbitrary colors into XYZ values (or vice versa). One of Grassman's Laws provides an approximate way to calculate tristimulus values for arbitrary colors. It is applicable because image digitizer channels are largely independent (i.e., the channels measure primary colors). Therefore, additive color mixing is appropriate. A mixing matrix M produces a linear combination of the gray shade tristimulus values. Define the column matrix of measured XYZ values for any color as:

$$X = \begin{vmatrix} X \\ Y \\ Z \end{vmatrix} \qquad \text{Eq. 4.0}$$

and the column matrix of predicted XYZ values computed from Equations 1.0, 1.1 and 1.2, as:

$$X_{rgb} = \begin{vmatrix} X_r(R) \\ Y_g(G) \\ Z_b(B) \end{vmatrix} \qquad \text{Eq. 4.1}$$

Then X and $X_{rgb}$ are connected by the linear relationship $$X = MX_{rgb} \qquad \text{Eq. 4.2}$$

where M is a 3×3 matrix. M is computed from all target colors, including shades of gray, in a least squares (pseudo-inverse) fashion, as follows. Define a 3×N matrix Q whose columns are N color target measurements $X_m$ of the type shown in Equation 4.0 as follows:

$$Q = |X_1 X_2 X_3 \ldots X_N| \qquad \text{Eq. 4.3}$$

Also define a 3×N matrix $Q_{rgb}$ containing the corresponding image digitizer channel tristimulus predictions obtained from Equations 1.0, 1.1 and 1.2 for the same N measurements as follows:

$$Q_{rgb} = |X_{rgb1} X_{rgb2} X_{rgb3} \ldots X_{rgbN}| \qquad \text{Eq. 4.4}$$

The computation of Q and $Q_{rgb}$ from XYZ measurements and estimates of all target colors is designated as numeral 120 in FIG. 2. The columns of Q and $Q_{rgb}$ are connected by matrix M from Equation 4.2, so therefore:

$$Q = MQ_{rgb} \qquad \text{Eq. 4.5}$$

This holds true if the image digitizer model (Equations 1.0, 1.1 and 1.2) is exactly true and color measurements are without error. The model and data are not exact, so the "best" (least squares) solution is obtained by solving Equation 4.5 using a pseudo-inverse as follows:

$$M = Q(Q_{rgb}Q_{rgb}^T)^{-1} \qquad \text{Eq. 4.6}$$

Superscript T denotes matrix transpose, and superscript $-1$ denotes matrix inverse. The computation of M is designated by numeral 130 in FIG. 2. The inverse is computed for a 3×3 matrix. Once the gain, offset, gamma, and mixing matrix M are known, Equations 1.0, 1.1, 1.2 and 4.2 are used to convert image digitizer R, G, and B into X, Y, and Z for any color. This step is designated by numeral 140 in FIG. 2. This conversion constitutes the image digitizer model algorithm denoted by numeral 5 in FIG. 1. In an application, such a conversion might be used to obtain XYZ values for the color database denoted by numeral 7 in FIG. 1.

The inverse transformation, converting X, Y, and Z into R, G, and B, is computed as follows:

$$X_{rgb} = M^{-1}X \qquad \text{Eq. 5.0}$$

$$R = (X_r^{1/gr} - G_r)/O_r \quad \text{Eq. 5.1}$$

$$G = (Y_g^{1/gg} - G_g)/O_g \quad \text{Eq. 5.2}$$

$$B = (Z_b^{1/gb} - G_b)/O_b \quad \text{Eq. 5.3}$$

Once gamma, gain, and offset are computed for a device, they can be saved in a computer data structure for all future color conversions. That is, only the step labeled 140 in FIG. 2 is necessary for subsequent color conversions. These image digitizer parameters are independent of the types of target measured by the image digitizer. XYZ values for textiles, paper products, photographs, and so on, can be computed from RGB values using the same parameter values.

TABLE 2 shows an example of image digitizer RGB values, and TABLE 3 and TABLE 4 show the corresponding computed image digitizer model parameters. More specifically, TABLE 3 shows gamma, gain and offset values for the R, G, and B image digitizer channels, and TABLE 4 shows the 3×3 mixing matrix M. Data was obtained from a Sharp ® JX-450 image digitizer. FIG. 4 shows a graph of measured and predicted XYZ tristimulus values for Macbeth ® gray shades, plotted against image digitizer RGB values. Predictions were computed from least squares values of gamma, gain, and offset values. FIG. 5 shows image digitizer XYZ measurements versus XYZ predictions for all Macbeth ® colors. Predictions were computed from least squares values of gamma, gain, offset, and the mixing matrix M.

A second aspect of this invention, of primary importance, is the ability to predict the color of colorants blended into an optically thick substrate. If colorants are mostly transparent, not very opaque, then they can be applied in layers and this invention still applies. An illustrative non-limiting example of this latter case is the spraying of textile dyes onto a carpet substrate. Layered colorants sometimes produce colors that depend on the order of colorant application, but this effect can be accommodated by this invention, and is described later in this Application.

In Kubelka-Munk Theory, the symbol R represents the fraction of light reflected by a sample at a specific wavelength of light. In this Application, R generically denotes scaled versions of one of the tristimulus values, X, Y, or Z. As previously discussed, the tristimulus coordinates X, Y, or Z represent averages over the red, green, and blue spectral bands, respectively. Therefore, our use of XYZ values for R differs from Kubelka-Munk Theory. The chosen scaling of XYZ values must produce R values that are less than 1.

The ratio of light absorption and light scattering coefficients of a colorant mixture is denoted by K/S. K/S is dimensionless, and has three components that correspond to the red, green, and blue spectral bands. K/S is related to R (the scaled XYZ values) by Equation 6.0. Equation 6.0 comes from Kubelka-Munk Theory for an optically thick substrate. Equation 6.1 is the mathematical inverse of Equation 6.0. Equation 6.0 is used for computing K/S when R is known by measurement. Equation 6.1 is used for predicting R when K/S is known.

$$K/S = (1-R)^2/2R \quad \text{Eq. 6.0}$$

$$R = (1+K/S) - [(1+K/S)^2 - 1]^{\frac{1}{2}} \quad \text{Eq. 6.1}$$

Equation 7.0 shows how absorption and scattering coefficients of individual colorants are combined in a mixture to produce K/S in this Application. The numerator of Equation 7.0 is a sum of light absorption terms for each colorant in the mixture. The denominator is a sum of light scattering terms for each colorant. N is the number of colorants.

$$\frac{K}{S} = \frac{K_o + \sum_{i=1}^{N} K_i C_i + \sum_{i=1}^{N} \sum_{j=1}^{N} K_{ij} C_i C_j}{1 + \sum_{i=1}^{N} S_i C_i} \quad \text{Eq. 7.0}$$

$K_o$ is the light absorption coefficient for a substrate without colorants. The zero subscript denotes zero colorant concentration. Equation 8.0 below establishes the connection between $R_o$ and $K_o$. The reflectance of uncolored substrate is denoted by $R_o$. This relationship comes from Equation 7.0 when relative colorant concentrations $C_i$ and $C_j$ are set to zero. This notation differs somewhat from standard colorimetric notation in that the substrate light scattering coefficient $S_o$ does not appear in Equation 7.0. The substrate light scattering coefficient is factored into the other coefficients in this Application, and explains why the dimensionless term "1" arises in the denominator of Equation 7.0. All light absorption and scattering coefficients in this document are dimensionless because of this normalization.

The light absorption and light scattering coefficients $K_i$ and $S_i$ correspond to similar terms in the Kubelka-Munk Model. The light absorption blend coefficients for colorants i and j are denoted as $K_{ij}$. We add these latter coefficients to the Kubelka-Munk Model in this Invention to compensate for the fact that XYZ values are used in place of spectral reflectivities at specific wavelengths. These coefficients are generally not related to molecular interactions between colorants in the mixing media, although the coefficients might compensate for such interactions when they exist. If colorants are applied in layers, then the ordering of the subscripts is important. For example, if colorant i is first applied to the substrate, followed by colorant j, we use $K_{ij}$. If colorant j is applied first, we use $K_{ji}$. $K_{ij}$ and $K_{ji}$ are not generally equal.

Equation 7.1 comes from rearranging Equation 7.0. It is linear with respect to colorant concentrations $C_i$, and constitutes the basis for the linear least squares fit calculations. Note K/S appears on both sides of the equation. During the fit process, K/S is computed from Equation 6.0. In all calculations, concentrations are expressed as fractions, not percentages.

$$\frac{K}{S} = K_o + \sum_{i=1}^{N}\left[\left(K_i - S_i\frac{K}{S}\right)C_i\right] + \sum_{i=1}^{N}\sum_{j=1}^{N}(K_{ij}C_iC_j) \quad \text{Eq. 7.1}$$

We now review the way that sample measurements are used to compute the light absorption, scattering, and absorption blending coefficients. The first step is to measure X, Y, Z values for uncolored substrate, denoted by numeral 170 in FIG. 6. See Step 1 in FIG. 7. When colorant is absent from the substrate, all colorant concentrations are zero, and we compute $K_o$ from Equation 8.0. $R_o$ represents scaled XYZ measurements of the substrate.

$$(K/S)_o = K_o = (1 - R_o)^2/2R_o \quad \text{Eq. 8.0}$$

When all colorants in a mixture are at very small concentrations, this constraint guarantees the predicted color of the substrate approaches the color of uncolored substrate. This calculation is labeled 200 in FIG. 6. See STEP 2 in FIG. 7. Once calculated, $K_o$ is used to compute the color of the substrate when colorant concentrations are exactly zero.

The second step in this process is to obtain color measurements from samples made when one colorant is present at several concentrations. This is labeled 180 in FIG. 6. Because only one colorant is used, all of the $K_{ij}C_iC_j$ terms in Equations 7.0 and 7.1 are zero. Let $K_1$ and $S_1$ denote the light absorption and scattering coefficients for colorant 1 at concentration $C_1$. K/S is calculated using Equations 6.0, and $K_o$ is already known. We compute $K_1$ and $S_1$ using a least squares fit as shown in Equations 9.0 through 9.5

$$y = K/S - K_o \qquad \text{Eq. 9.0}$$

$$x_1 = C_1 \qquad \text{Eq. 9.1}$$

$$x_2 = (K/S)C_1 \qquad \text{Eq. 9.2}$$

$$w = [R/(R_o - R)^2]^2 \qquad \text{Eq. 9.3}$$

$$K_1 = \frac{-\sum_{q=1}^{P}(w_q x_{2q}^2)\sum_{q=1}^{P}(w_q x_{1q} y_q) + \sum_{q=1}^{P}(w_q x_{1q} x_{2q})\sum_{q=1}^{P}(w_q x_{2q} y_q)}{-\sum_{q=1}^{P}(w_q x_{1q}^2)\sum_{q=1}^{P}(w_q x_{2q}^2) + \sum_{q=1}^{P}(w_q x_{1q} x_{2q})^2} \qquad \text{Eq. 9.4}$$

$$S_1 = \frac{-\sum_{q=1}^{P}(w_q x_{1q} x_{2q})\sum_{q=1}^{P}(w_q x_{1q} y_q) + \sum_{q=1}^{P}(w_q x_{1q}^2)\sum_{q=1}^{P}(w_q x_{2q} y_q)}{-\sum_{q=1}^{P}(w_q x_{1q}^2)\sum_{q=1}^{P}(w_q x_{2q}^2) + \sum_{q=1}^{P}(w_q x_{1q} x_{2q})^2} \qquad \text{Eq. 9.5}$$

Variable y denotes the dependent variable, and $x_1$ and $x_2$ denote independent variables. Variable w is a least squares weight forcing relative errors to be uniform for XYZ predictions. Index q refers to different colorant concentrations, and P designates the total number of different colorant concentrations (the total number of samples). This calculation is labeled 210 in FIG. 6. See STEP 3 in FIG. 7. Once calculated, $K_1$ and $S_1$ are used to predict color produced by different concentrations of colorant 1.

The third step of this process is to obtain color measurements of samples made with two colorants present at different concentrations. Let two colorants be labeled by subscripts 1 and 2. Both colorant concentrations, $C_1$ are $C_2$, must be non-zero in the data set used for the least squares fit. Total concentration, $C_1 + C_2$, must not exceed 100%. It is best for these concentrations to span as wide a range as possible, and convenient (although not necessary) to choose $C_1 + C_2 = 100\%$. $K_o$, $K_1$, $S_1$, $K_2$, and $S_2$ must already be known for colorants 1 and 2. As usual, K/S is calculated using Equation 6.0. $K_{12}$ is to be determined. The step of measuring X, Y, Z values for substrates having pairs of colorants applied at several concentrations is denoted by numeral 190 in FIG. 6.

$$y = (1 + S_1C_1 + S_2C_2)(K/S) - (K_o + K_1C_1 + K_2C_2) \qquad \text{Eq. 10.0}$$

$$x = C_1C_2 \qquad \text{Eq. 10.1}$$

$$w = [R/(R_o - R)^2]^2 \qquad \text{Eq. 10.2}$$

$$K_{12} = \frac{\sum_{q=1}^{P}(w_q x_q y_q)}{\sum_{q=1}^{P}(w_q x_q^2)} \qquad \text{Eq. 10.3}$$

Index q refers to different colorant concentrations, and P designates the total number of pairs of blends (the total number of samples). This calculation is labeled 220 in FIG. 6. See STEP 4 in FIG. 7. Once calculated, $K_{12}$ (along with $K_o$, $K_1$, $S_1$, $K_2$, and $S_2$) is used to predict color produced by different blends of colorants 1 and 2.

The same procedure is used to determine parameters for other colorants. Once obtained, $K_o$, $K_i$, $S_i$, and $K_{ij}$ can be used to compute XYZ values for any colorant blend by utilizing equations 7.0 and 6.1. This is the final step designated as 230 in FIG. 6.

The color of one colorant on a given substrate is defined by nine numbers: $K_o$, $K_1$, $S_1$. Two colorants on a given substrate have color defined by eighteen numbers: $K_o$, $K_1$, $S_1$, $K_2$, $S_2$, $K_{12}$. (We exclude the case where $K_{21}$ is necessary as discussed earlier in this Application.) The color of three colorants on a given substrate is defined by thirty numbers: $K_o$, $K_1$, $S_1$, $K_2$, $S_2$, $K_3$, $S_3$, $K_{12}$, $K_{13}$, $K_{23}$. These coefficients summarize all sample measurements, and would normally be saved in a computer database for subsequent blend calculations; e.g., 7 in FIG. 1.

One application for this type of colorant blending analysis is the application of dyes to a carpet substrate using computer controlled dye jet technology. This is not to be construed as limiting in any way, since any optically thick substrate can be utilized with this process. Measurements must be made after the carpet is in final product form; e.g., after the carpet dye (if any) is fixed, after shearing, after topical treatments are applied, and so on. This requirement includes measurements made of undyed samples used to compute $K_o$ for the carpet substrate. If a colorimeter is used instead of an image digitizer, it is preferable to limit measurements to one colorimeter. If the colorimeter provides CIE L*a*b measurements, these color coordinates must be converted into XYZ tristimulus values using the appropriate colorimetric equations. The colorimeter must be calibrated using the largest possible aperture, preferably at least 2" in diameter. Glass is not used on the colorimeter aperture because crushing the carpet pile against glass adds a gloss that is not observed on carpet during normal use. Carpet pile on samples is manually set before measurement so it lies in its preferred direction.

FIG. 7 consists of four graphical embodiments entitled STAGED REGRESSION STEPS FOR DYE BLEND CALCULATIONS. It is a graphic representation of the calculations required to obtain colorant light absorption, scattering, and blending coefficients. The example assumes that the blended colorants consist of two dyes applied to a textile substrate. Dyes 1 and 2 are blended at relative concentrations $C_1$ and $C_2$, respectively. $C_1$, $C_2$ and R are depicted by coordinate axes at right angles.

Refer to STEP 1 of FIG. 7. As stated earlier, it is computationally simpler to use the ratio K/S rather than R. The mathematical connection between K/S and R is shown in Step 1 of FIG. 7. All calculated predictions are obtained from measurements of undyed or dyed samples. One sample must have no colorant applied ($C_1=C_2=0$), and is the point labeled "No Dye". This point has the lightest measured color, so the measurement is shown as the data point highest in the R direction.

Several samples must have different amounts of Dye 1. These are the points labeled "33% Dye 1", "66% Dye 1", and "100% Dye 1", and all lie in the plane formed by the $C_1$ and R axes. These points are lower (darker) then the "No Dye" measurement. The greater the amount of Dye 1, the closer (darker) the measurements move towards the $C_1$ axis. Similar statements can be made for the samples with different amounts of Dye 2. In this example, measurements of R for Dye 2 are smaller than for Dye 1. This means Dye 1 is lighter in color than Dye 2 for color component R.

STEP 1 also shows three measurements with different blends of Dyes 1 and 2. Only one measurement is labeled, "50% Dye 1+50% Dye 2". A dashed line lies in the plane formed by the $C_1$ and $C_2$ axes. The points on this line satisfy the equation $C_1+C_2=100\%$. It is convenient to prepare blend samples so this equation is satisfied. The three two-dye blend colors shown in the drawing satisfy this relationship, and therefore lie above the dashed line in this three dimensional space. For example, the other two points can be "33% Dye 1+67% Dye 2" and "67% Dye 1+33% Dye 2". The sum of the blend concentrations is then 100% for both dye blends.

In summary, if we viewed the coordinate system in the drawing down along the R axis, then the one-dye measurements would be projected onto the $C_1$ or $C_2$ axes, and the two-dye blend measurements would be projected onto the dashed line crossing the $C_1$ and $C_2$ axes. Arbitrary blends satisfying the constraint $C_1+C_2 \leq 100\%$ would fall inside the triangle formed by these three lines.

Refer to STEP 2 of FIG. 7. The first stage in the series of regressions uses samples without colorants to compute $K_o$. A 100% wet out solution without colorant must sometimes be applied to uncolored substrates (such as greige textile fabric), and be processed as pare of mix blanket samples, if it imparts any color or otherwise alters appearance. This "clear" solution is sometimes used to blend colorants on a substrate. It would therefore be used during the creation of the colorant dilution and binary colorant blend samples.

Zero colorant sample measurements are used to compute the light absorption coefficient for the substrate, $K_o$. If we stop our calculations at this point, and use $K/S=K_o$ to predict colors for blends of Dye 1 and 2, the predictions would only match the measurement when $C_1=C_2=0$. Predictions are denoted in Step 2 of FIG. 7 by the triangular plane of predictions intersecting the "No Dye" point. In this first stage of the regression, only the "No Dye" prediction matches the measurements.

Refer to STEP 3 in FIG. 7. This step uses colored samples to compute $K_1$, $S_1$, $K_2$, and $S_2$. It is recommended that each colorant have at least five different concentrations, although only three are shown in FIG. 7. 0% concentration is not used in this step, but it should include 100% concentration. One possible set is 15%, 20%, 30%, 50%, and 100%. The choice of uneven concentration increments is more likely to produce a visually uniform color gradient. Small amounts of colorant have a strong impact on final color. If ten different concentrations can be accommodated, a possible set is 15%, 20%, 25%, 30%, 35%, 40%, 50%, 60%, 80%, and 100%.

Single colorant dilution measurements are used to compute light absorption and scattering coefficients. These new terms are added to the formula for K/S, as shown in STEP 3. Also shown as solid lines is the new prediction surface. The new predictions lie close to the single dye measurements. They do not match perfectly because the calculation is a least squares fit. Goodness of fit are limited by measurement precision, and by degrees of freedom in our mathematical model. Note the prediction still matches the "No Dye" measurement. The second stage of regression does not disturb the first stage of regression. However, the prediction surface still does not match the dye blend measurements satisfactorily.

Refer to STEP 4 of FIG. 7. The final step uses pairs of colorants to establish $K_{ij}$. It is recommended that each colorant have at least five different concentrations, although only three are shown in FIG. 7. 0% and 100% concentrations must not be used. One possible set is 15%/85%, 33%/67%, 50%/50%, 67%/33%, and 85%/15%. If ten different concentrations can be accommodated, one possible set is 15%/85%, 20%/80%, 25%/25%, 30%/70%, 40%/60%, 60%/40%, 70%/30%, 75%/25%, 80%/20%, and 85%/15%. The choice of uneven concentration increment is more likely to produce a visually uniform color gradient. Small amounts of colorant have a strong impact on final color.

Colorant pair blending measurements are used to compute light absorption blending coefficients. This adds one more term to the formula for K/S, as shown in STEP 4. Now the prediction curve satisfactorily predicts all of the dye measurements. Again, the final predictions do not match perfectly because the calculation is a least squares fit. This third regression stage has no effect on no-dye or dye pair blending predictions.

In summary, the modified Kubelka-Munk Model is fit to measurements in stages, each successive stage including more measurement data, and further reducing the total least squares error. The accuracy of prior predictions are not affected. The algebraic reason for this decoupling is that each expression for the numerator K and denominator S in the equation for K/S contains increasingly higher ordered products of colorant concentrations. If both colorant concentrations are zero, all terms with $C_1$, $C_2$, and $C_1*C_2$ vanish. The only term left is the one shown in STEP 2. If one colorant concentration is zero, terms with $C_1*C_2$ vanish. The only terms left are ones shown in STEP 3. Only when both concentrations are non-zero, so that the $C_1*C_2$ term is present, does all of the terms shown in STEP 4 apply.

Predictions of colorant blends fall on the curved surface shown in STEP 4 of the drawing. Predictions are satisfactory for our specified applications over the entire surface. Arbitrary predictions are interpolations based on the K/S model, made with the shown formula (the same as Equation 7.0). When three colorants are involved, the interpolation region is a volume, and so on. While this mathematical process can be extended to higher order terms (e.g., $S_{12}$, $K_{123}$, $S_{123}$, and so on), we find this is unnecessary for tristimulus coordinate prediction.

The addition of a third colorant does not affect the values of $K_0$, $K_1$, $S_1$, $K_2$, $S_2$, or $K_{12}$. But we must compute coefficients $K_3$, $S_3$, $K_{13}$, and $K_{23}$, if predictions are desired for blends involving the third colorant. Again, all of the prior predictions for blends of Dye 1 and Dye 2 remain unaffected, even though extra terms are added to the K/S equation.

TABLE 5 through TABLE 7 show a lists of light absorption, light scattering, and light absorption blend coefficients for seven textile dyes. These dyes were applied to carpet substrates by spraying the dyes under computer control. There are three dark dyes ("deep"), three medium dyes ("pale"), and one light dye (yellow). Blend predictions for a subset of four dyes (pale red, pale green, pale blue and yellow), are shown in TABLE 8 through TABLE 11.

The third and final aspect of this Invention is to display the calculated blend colors on an RGB based electronic display. It is common for computerized design systems to display colors on cathode ray tubes (CRTs). Any electronic display using RGB values, such as liquid crystal displays, among others, can be employed for the purposes of this Application. Cathode ray tubes (CRTs) emit light in three primary colors. This excites the red, green and blue receptors in the human retina. For convenience, we refer to CRT displays in this Application, although any RGB based electronic display can be used such as an electroluminiscent display or a plasma display. Colors emitted by electronic displays are measured by a radiometers or chroma meters (e.g., Minolta ® TV-Color Analyzer II, Minolta ® CRT Color Analyzer CA-100, Minolta ® Chroma Meter CS-100). Of the various color coordinates available from color measurement devices, as previously stated, XYZ tristimulus values are chosen in this Application.

XYZ values measured from devices that emit light have dimensions; e.g., candelas per square meter. These measurements are said to be absolute. Relative XYZ values will now be denoted X'Y'Z'. These values are dimensionless, and usually expressed as a percentage. Different absolute measurements for the same white media (having the same chromaticity) are usually scaled to the same relative values for electronic visual display or computer imaging hardcopy applications. The maximum Y value possible for a display device is sometimes chosen to convert absolute XYZ measurements into relative X'Y'Z' values. For example, if the maximum Y value possible for a CRT is 80 cd/m$^2$, and one displayed color measures X=60 cd/m$^2$, Y=70 cd/m$^2$, Z=75 cd/m$^2$, then the corresponding relative X'Y'Z' values are X'=75.00, Y'=87.50, and Z'=93.75. Although these are percentages, the percent sign is customarily omitted.

As discussed earlier in this Application, it is common for color measurements to be expressed in terms of chromaticity x and y, and "luminance" Y. Conversion between XYZ values to xyY values is accomplished as described earlier in this Application. Note that the dimensioned values of X and Y are thereby converted into dimensionless values of x and y. The chromaticity range of a typical CRT color monitor used for computer aided design is shown in FIG. 3, and compared with chromaticities of Macbeth ® ColorChecker ® colors.

Current electronic color displays do not use XYZ values directly to display colors. Such devices commonly use RGB values, indicating the strength of red, green, and blue phosphor light emission. Red, green, and blue color components are denoted as R, G, and B, respectively. RGB values commonly range from 0 through 255. We show how to convert from absolute XYZ tristimulus values to RGB electronic display values. FIG. 1 shows a CRT display as 4, that accepts and returns a color as RGB values. Conversion between XYZ and RGB values is performed by 6 in FIG. 1, a CRT Model Algorithm.

In phase one of the computations, separate measurements are made of the red, green, and blue CRT phosphors at different brightnesses. This must be done for several levels of RGB values. A typical set of RGB values for the phosphor measurements are 50, 100, 150, 200, 225, and 255. It is preferable to include the smallest RGB value that provides a dependable measurement. This is about Y=0.6 cd/m$^2$ for the Minolta ® TV-Color Analyzer II, and about Y=0.3 cd/m$^2$ for the Minolta ® CRT Color Analyzer CA-100. This data collection step is numeral 260 in FIG. 8. In this document, RGB and XYZ values are normalized so values fall mostly between 0 and 1. This step is denoted in FIG. 8 by numeral 270. These measurements are used to compute model parameters that are characteristic of the red, green, and phosphors. In phase two of the computations, a mixing matrix is computed so any color can be converted, not just colors produced when one phosphor is on.

Earlier in this Application the Image Digitizer Model Algorithm (5 in FIG. 1) was described. The CRT Model Algorithm (6 in FIG. 1) for electronic color display is very similar. In fact, the CRT Model Algorithm came first and was adapted for digitizer color measurement to create the Digitizer Model Algorithm for this Invention. The terminology used in the CRT Model Algorithm (e.g., gamma, gain, offset) are associated with the internal electronics of a CRT; e.g., electron beam intensity and amplifier voltages. As this Application demonstrates, the mathematical aspects of the model can be adapted to RGB based devices such as image digitizers and other kinds of electronic color display devices.

Tristimulus values for red, green, and blue CRT phosphors are denoted by $X_r$, $Y_g$, and $Z_b$, respectively, and are generically referred to as $X_r Y_g Z_b$ values. $X_r$ is the X value measured when only the red phosphor is turned on (G and B are zero), $Y_g$ is the Y value measured when only the green phosphor is turned on (R and B are zero), and $Z_b$ is the Z value measured when only the blue phosphor is turned on (R and G are zero).

For a CRT, gamma is the parameter that characterizes the nonlinear relationship between the electron beam acceleration voltage and the resulting color brightness. Gamma values for the red, green and blue phosphors are denoted as $g_r$, $g_g$, and $g_b$, respectively. These are collectively referred to as "gamma" or g.

For a CRT, gain is the parameter that characterizes the perceived contrast level of resulting colors. Gain values for the red, green and blue phosphors are denoted as $G_r$, $G_g$, and $G_b$, respectively. These are collectively referred to as "gain" or G.

For a CRT, offset if the parameter that characterizes the perceived brightness of resulting colors. Offset values for the red, green and blue phosphors are denoted as $O_r$, $O_g$, and $O_b$, respectively. These are collectively referred to as "offset" or O.

Gain, offset and gamma parameters in the CRT Model Algorithm define a quantitative relationship between measured color (absolute XYZ tristimulus values) and CRT color coordinates color components (RGB values) for each CRT phosphor. This is shown in the following equations. You will notice these equations are identical to those presented earlier in this Application for the Image Digitizer Model Algorithm.

$$X_r = (G_r + O_r * R)^{g_r} \qquad \text{Eq. 1.0}$$

$$Y_g = (G_g + O_g * G)^{g_g} \qquad \text{Eq. 1.1}$$

$$Z_b = (G_b + O_b * B)^{g_b} \qquad \text{Eq. 1.2}$$

We now explain how to compute the CRT model parameters from the color phosphor measurements. $X_r$ is measured when only the red phosphor is turned on (G and B are zero), $Y_g$ is measured when only the green phosphor is turned on (R and B are zero), and $Z_b$ is measured when only the blue phosphor is turned on (R and G are zero). The first step is to chose either the red, green or blue phosphor for further computation as designated by numeral 280 in FIG. 8. Equations 1.0, 1.1 and 1.2 are in the following form (x and y are not chromaticity variables):

$$y = (G + O*x)^g \qquad \text{Eq. 2.0}$$

Equation 2.0 can be rewritten as an equation linear in $y^{1/g}$. That is, a graph of x as a function of $y^{1/g}$ is a straight line.

$$y^{1/g} = G + O*x \qquad \text{Eq. 2.1}$$

For specific values of g, G, and O, we define a least squares error E. A subscript m denotes individual measurements $x_m$ (representing $R_m$ or $G_m$ or $B_m$) and $y_m^{1/g}$ (representing $X_{rm}^{1/g_r}$ or $Y_{gm}^{1/g_g}$ or $Z_{bm}^{1/g_b}$). There is a total of N measurements for a phosphor, so m ranges from 1 to N. The number of measurements per phosphor need not be the same.

$$E^2 = \sum_{m=1}^{N} \left( y_m^{\frac{1}{g}} - G - O*x_m \right)^2 \qquad \text{Eq. 2.2}$$

For computational purposes, an expanded form of Equation 2.2 is preferred. Equation 2.3 is expressed in terms of summations that will already exist in prior computational steps in the final algorithm.

$$E^2 = S_{yy} - 2GS_y - 2OS_{xy} + O^2 S_{xx} + 2GOS_x + G^2 S \qquad \text{Eq. 2.3}$$

The following summation equations determine the "S" variable values:

$$S = \sum_{m=1}^{N} (1) \qquad \text{Eq. 2.4}$$

$$S_x = \sum_{m=1}^{N} (x_m) \qquad \text{Eq. 2.5}$$

$$S_{xx} = \sum_{m=1}^{N} (x_m^2) \qquad \text{Eq. 2.6}$$

$$S_y = \sum_{m=1}^{N} \left( y_m^{\frac{1}{g}} \right) \qquad \text{Eq. 2.7}$$

$$S_{yy} = \sum_{m=1}^{N} \left( y_m^{\frac{2}{g}} \right) \qquad \text{Eq. 2.8}$$

$$S_{xy} = \sum_{m=1}^{N} \left( x_m y_m^{\frac{1}{g}} \right) \qquad \text{Eq. 2.9}$$

The variable S in Equation 2.4 is equal to the number of phosphor measurements. Equation 2.1 is nonlinear in g. Because of this nonlinearity, our approach is not to minimize the least squares error found in Equation 2.3 for g, G, and O simultaneously. Instead, we pick a reasonable value for g (290 in FIG. 8) and find G and O that minimize the least squares error (300 in FIG. 8). For this g, G and O are given by Equations 3.0, 3.1, and 3.2. These Equations are solutions to the least squares fit for a given value of g.

$$D = S_{xx} S - S_x^2 \qquad \text{Eq. 3.0}$$

$$G = (S_{xx} S_y - S_x S_{xy})/D \qquad \text{Eq. 3.1}$$

$$O = (-S_x S_y + S S_{xy})/D \qquad \text{Eq. 3.2}$$

Our chosen g and the computed optimal values for G and O can be put into Equation 2.3 to compute the least squares error E (or $E^2$) as designated by numeral 310 in FIG. 8. We then can pick another value of g, which allows us to compute another set of optimal values of G and O, that in turn gives a new least squares error. This step is designated by numeral 320 in FIG. 8. For two estimates of g, the better value is the one giving the smaller least squares error E (or $E^2$). The least squares error E is not sensitive to changes in gamma g by differences of 0.25 The algorithm chooses values of g from 1 through 5 in increments of 0.25. As outlined above, for each g, compute G and O from Equations 2.4 through 2.9, and 3.0 through 3.2, and least squares error $E^2$ from Equation 2.3. The best value of g is the one minimizing $E^2$. This final selection of g is designated by numeral 330 in FIG. 8.

As previously stated with regard to numeral 280 of the flowchart in FIG. 8, this calculation is repeated separately for the red, green, and blue components of the corresponding measured phosphor colors. This step is designated by numeral 340 in FIG. 8, which will repeat steps 290, 300, 310, 320, and 330 in FIG. 8 for each CRT phosphor.

Once gamma, gain, and offset parameters are computed, Equation 1.0 predicts $X_r$ from R, when G and B are zero, with minimized error. And so on for the green and blue phosphors (only one phosphor on, the other two off). Equations 1.0, 1.1, and 1.2 do not by themselves accurately predict arbitrary colors.

The next step is to use all of the phosphor measurements to convert RGB values of arbitrary colors into XYZ values (or vice versa). One of Grassman's Laws provides an approximate way to calculate tristimulus values for arbitrary colors. It is applicable because CRT monitors creates colors by additive color mixing. A mixing matrix M produces a linear combination of the phosphor tristimulus values. Define the column matrix of measured tristimulus coordinates for any color as:

$$X = \begin{vmatrix} X \\ Y \\ Z \end{vmatrix} \qquad \text{Eq. 4.0}$$

and the column matrix of predicted XYZ values computed from Equations 1.0, 1.1 and 1.2, as:

$$X_{rgb} = \begin{vmatrix} X_r(R) \\ Y_g(G) \\ Z_b(B) \end{vmatrix} \qquad \text{Eq. 4.1}$$

Then X and $X_{rgb}$ are connected by the linear relationship $$X = M X_{rgb} \qquad \text{Eq. 4.2}$$

where M is a 3×3 matrix. M is computed from all of the measurements used to compute the gain, offset and gamma parameters, in a least squares (pseudo-inverse) fashion, as follows. Define a 3×3N matrix Q whose columns are the 3N phosphor measurements $X_m$ of the kind defined in Equation 4.0. Recall there are N measurements each for red, green, and blue phosphors, hence there are 3N columns to the matrix.

$$Q = |X_1 X_2 X_3 \ldots X_N| \qquad \text{Eq. 4.3}$$

Also define a 3×3N matrix $Q_{rgb}$ containing the corresponding predictions obtained from Equations 1.0, 1.1 and 1.2 for the same 3N measurements.

$$Q_{rgb} = |X_{rgb1} X_{rgb2} X_{rgb3} \ldots X_{rgbN}| \qquad \text{Eq. 4.4}$$

The computation of Q and $Q_{rgb}$ from XYZ measurements and predictions of all phosphor color measurements is designated as numeral 350 in FIG. 8. The columns of Q and $Q_{rgb}$ are connected by matrix M in Equation 4.2, so therefore:

$$Q = M Q_{rgb} \qquad \text{Eq. 4.5}$$

This holds true if the CRT model (Equations 1.0, 1.1, and 1.2) is exactly true and color measurements are without error. The model and data are not exact, so the "best" (least squares) solution is obtained by solving Equation 4.5 using a pseudo-inverse as follows:

$$M = Q(Q_{rgb} Q_{rgb}^T)^{-1} \qquad \text{Eq. 4.6}$$

Superscript T denotes matrix transpose, and superscript −1 denotes matrix inverse. This step is designated by numeral 360 in FIG. 8. The inverse is performed on a 3×3 matrix. Once the gain, offset, gamma, and mixing matrix M are known, Equations 1.0, 1.1, 1.2 and 4.2 are used to convert CRT R, G, and B into X, Y, and Z for any color. The inverse transformation, converting X, Y, and Z into R, G, and B, is computed as follows:

$$X_{rgb} = M^{-1} X \qquad \text{Eq. 5.0}$$

$$R = (X_r^{1/g_r} = G_r)/O_r \qquad \text{Eq. 5.1}$$

$$G = (Y_g^{1/g_g} = G_g)/O_g \qquad \text{Eq. 5.2}$$

$$B = (Z_b^{1/g_b} = G_b)/O_b \qquad \text{Eq. 5.3}$$

FIG. 9 shows a graph of CRT model calculations for red, green and blue phosphors for a typical CRT used for computer aided design. XYZ tristimulus values are plotted against RGB values. FIG. 10 shows CRT measurements versus predictions for all phosphor colors. XYZ predictions are plotted against XYZ measurements.

We now have the means to convert between absolute color measurements (XYZ tristimulus values), and electronic color display components (RGB values). A conversion between absolute color measurements (XYZ tristimulus values), and relative color measurements (X'Y'Z' tristimulus values), is also necessary. There are subtle issues in reproducing colors on an electronic display involving human color vision that are not addressed here. And, to avoid discussing these issues we adopt a linear relationship between XYZ and X'Y'Z'. In matrix notation $$X = W(X' - B) \qquad \text{Eq. 11.0}$$

$$X' = (X/W) + B \qquad \text{Eq. 11.1}$$

where W and B are scalars. Scalars are used so the red, green, and blue color components are identically weighted. W and B adjust levels of light and dark colors, respectively. X and X' are three component column matrices representing XYZ and X'Y'Z', respectively.

When B=0%, colors are usually perceived to be washed out on typical CRT color displays, and black is not dark enough. Increasing B improves color contrast. We find B=2% gives best results. If necessary, B can be a negative number, and W can be greater than one. W can be calculated so computed RGB values never exceed their limit, usually values of 255. By choosing a suitable white standard (for example, white in the Macbeth® ColorChecker® color set), and comparing these relative X'Y'Z values to the absolute XYZ values obtained with a CRT when RGB values are at their maximum level, Equation 11.0 can be use to compute W. (Explicit formulas can be derived for this purpose.) This allows the full range of CRT luminance to be used for displaying colors. W is responsible for converting absolute color measurements XYZ to relative color measurements X'Y'Z', and is therefore not dimensionless. The selection or computation of brightness W and contrast B is designated by numeral 370 in FIG. 8.

We now have the means to convert between relative color measurements (X'Y'Z' tristimulus values) obtained from color measurement equipment, and computer color components (RGB values). This step is designated by numeral 380 in FIG. 8. This is also shown in FIG. 1 as the retrieval of XYZ data from the XYZ COLOR DATABASE 7, performing the above operations using the CRT MODEL ALGORITHM 6, and then displaying the RGB values on the CRT DISPLAY 4. Furthermore, RGB values obtained from the CRT DISPLAY 4, can be transformed into XYZ coordinates by the CRT MODEL ALGORITHM 6, and then sent back to the XYZ COLOR DATABASE 7.

It is not intended that the scope of the invention be limited to the specific embodiments illustrated and described. Rather, it is intended that the scope of the invention be defined by the appended claims and their equivalents.

TABLE 1

| NO. | NAME | x | y | Y | X | Y | Z |
|---|---|---|---|---|---|---|---|
| 1 | Dark Skin | 0.400 | 0.350 | 10.1 | 11.54 | 10.10 | 7.21 |
| 2 | Light Skin | 0.377 | 0.345 | 35.8 | 39.12 | 35.80 | 28.85 |
| 3 | Blue Sky | 0.247 | 0.251 | 19.3 | 18.99 | 19.30 | 38.60 |
| 4 | Foliage | 0.337 | 0.422 | 13.3 | 10.62 | 13.30 | 7.60 |
| 5 | Blue Flower | 0.265 | 0.240 | 24.3 | 26.83 | 24.30 | 50.12 |
| 6 | Bluish Green | 0.261 | 0.343 | 43.1 | 32.80 | 43.10 | 49.76 |

TABLE 1-continued

| NO. | NAME | x | y | Y | X | Y | Z |
|---|---|---|---|---|---|---|---|
| 7 | Orange | 0.506 | 0.407 | 30.1 | 37.42 | 30.10 | 6.43 |
| 8 | Purplish Blue | 0.211 | 0.175 | 12.0 | 14.47 | 12.00 | 42.10 |
| 9 | Moderate Red | 0.453 | 0.306 | 19.8 | 29.31 | 19.80 | 15.59 |
| 10 | Purple | 0.285 | 0.202 | 6.6 | 9.31 | 6.60 | 16.76 |
| 11 | Yellow Green | 0.380 | 0.489 | 44.3 | 34.43 | 44.30 | 11.87 |
| 12 | Orange Yellow | 0.473 | 0.438 | 43.1 | 46.54 | 43.10 | 8.76 |
| 13 | Blue | 0.187 | 0.129 | 6.1 | 8.84 | 6.10 | 32.34 |
| 14 | Green | 0.305 | 0.478 | 23.4 | 14.93 | 23.40 | 10.62 |
| 15 | Red | 0.539 | 0.313 | 12.0 | 20.66 | 12.00 | 5.67 |
| 16 | Yellow | 0.448 | 0.470 | 59.1 | 56.33 | 59.10 | 10.31 |
| 17 | Magenta | 0.364 | 0.233 | 19.8 | 30.93 | 19.80 | 34.25 |
| 18 | Cyan | 0.196 | 0.252 | 19.8 | 15.40 | 19.80 | 43.37 |
| 19 | White | 0.310 | 0.316 | 90.0 | 88.29 | 90.00 | 106.52 |
| 20 | Neutral 8.0 | 0.310 | 0.316 | 59.1 | 57.98 | 59.10 | 69.95 |
| 21 | Neutral 6.5 | 0.310 | 0.316 | 36.2 | 35.51 | 36.20 | 42.84 |
| 22 | Neutral 5.0 | 0.310 | 0.316 | 19.8 | 19.42 | 19.80 | 23.43 |
| 23 | Neutral 3.5 | 0.310 | 0.316 | 9.0 | 8.83 | 9.00 | 10.65 |
| 24 | Black | 0.310 | 0.316 | 3.1 | 3.04 | 3.10 | 3.67 |

TABLE 2

| NO. | NAME | X | Y | Z | R | G | B |
|---|---|---|---|---|---|---|---|
| 1 | Dark Skin | 11.54 | 10.10 | 7.21 | 110 | 70 | 62 |
| 2 | Light Skin | 39.12 | 35.80 | 28.85 | 190 | 142 | 135 |
| 3 | Blue Sky | 18.99 | 19.30 | 38.60 | 99 | 119 | 158 |
| 4 | Foliage | 10.62 | 13.30 | 7.60 | 84 | 91 | 64 |
| 5 | Blue Flower | 26.83 | 24.30 | 50.12 | 133 | 128 | 179 |
| 6 | Bluish Green | 32.80 | 43.10 | 49.76 | 128 | 181 | 174 |
| 7 | Orange | 37.42 | 30.10 | 6.43 | 192 | 110 | 69 |
| 8 | Purplish Blue | 14.47 | 12.00 | 42.10 | 86 | 92 | 168 |
| 9 | Moderate Red | 29.31 | 19.80 | 15.59 | 181 | 88 | 105 |
| 10 | Purple | 9.31 | 6.60 | 16.76 | 90 | 64 | 106 |
| 11 | Yellow Green | 34.43 | 44.30 | 11.87 | 150 | 170 | 88 |
| 12 | Orange Yellow | 46.54 | 43.10 | 8.76 | 203 | 146 | 80 |
| 13 | Blue | 8.84 | 6.10 | 32.34 | 63 | 64 | 157 |
| 14 | Green | 14.93 | 23.40 | 10.62 | 87 | 135 | 88 |
| 15 | Red | 20.66 | 12.00 | 5.67 | 173 | 63 | 64 |
| 16 | Yellow | 56.33 | 59.10 | 10.31 | 221 | 186 | 82 |
| 17 | Magenta | 30.93 | 19.80 | 34.25 | 183 | 96 | 151 |
| 18 | Cyan | 15.40 | 19.80 | 43.37 | 80 | 126 | 165 |
| 19 | White | 88.29 | 90.00 | 106.52 | 250 | 249 | 253 |
| 20 | Neutral 8.0 | 57.98 | 59.10 | 69.95 | 197 | 199 | 215 |
| 21 | Neutral 6.5 | 35.51 | 36.20 | 42.84 | 154 | 153 | 169 |
| 22 | Neutral 5.0 | 19.42 | 19.80 | 23.43 | 116 | 114 | 127 |
| 23 | Neutral 3.5 | 8.83 | 9.00 | 10.65 | 80 | 70 | 88 |
| 24 | Black | 3.04 | 3.10 | 3.67 | 39 | 34 | 43 |

TABLE 3

COMPUTED IMAGE DIGITIZER MODEL PARAMETERS

| | gamma | gain | offset |
|---|---|---|---|
| R | 2.00 | 0.0169 | 0.9480 |
| G | 2.25 | 0.0985 | 0.8825 |
| B | 2.75 | 0.1492 | 0.8760 |

TABLE 4

COMPUTED IMAGE DIGITIZER MODEL PARAMETERS $$M = \begin{vmatrix} 0.5003 & 0.4049 & 0.0609 \\ 0.2182 & 0.8769 & -0.0835 \\ -0.0213 & 0.0398 & 1.0050 \end{vmatrix}$$

TABLE 5

| $K_{ox}$ | $K_{oy}$ | $K_{oz}$ |
|---|---|---|
| 0.09328 | 0.06876 | 0.06218 |

TABLE 6

| DYE NO. | DYE NAME | $K_x$ | $K_y$ | $K_z$ | $S_x$ | $S_y$ | $S_z$ |
|---|---|---|---|---|---|---|---|
| 1 | Deep Red | 16.2549 | 32.8022 | 74.9094 | 2.5897 | 2.2356 | 0.0515 |
| 2 | Deep Green | 14.7451 | 9.7676 | 10.2859 | 0.3686 | 0.4831 | 0.3583 |
| 3 | Deep Blue | 12.7319 | 10.4875 | 3.0545 | 0.8023 | 0.6334 | 0.7765 |
| 4 | Pale Red | 1.8067 | 2.0707 | 3.1958 | 1.6599 | 1.4389 | 1.2618 |
| 5 | Pale Green | 2.3385 | 1.9950 | 4.1897 | 0.9957 | 0.9260 | 1.0124 |
| 6 | Pale Blue | 3.0687 | 2.4645 | 1.7175 | 0.6789 | 0.6329 | 0.6966 |
| 7 | Yellow | 0.8954 | 0.7291 | 3.2458 | 1.9394 | 1.3345 | 0.8841 |

TABLE 7

| Dye No. i | Dye No. j | Dye Blend | $K_{ijx}$ | $K_{ijy}$ | $K_{ijz}$ |
|---|---|---|---|---|---|
| 1 | 2 | Deep Red + Deep Green | 142.4729 | 199.4130 | 63.1336 |
| 1 | 3 | Deep Red + Deep Blue | 189.8662 | 252.6969 | 133.5376 |
| 2 | 3 | Deep Green + Deep Blue | 21.6591 | 13.2452 | 9.8802 |
| 4 | 5 | Pale Red + Pale Green | 3.1668 | 2.6439 | 4.5439 |
| 4 | 6 | Pale Red + Pale Blue | 7.2048 | 5.1524 | 2.1763 |
| 5 | 6 | Pale Green + Pale Blue | 4.3949 | 3.2950 | 1.5603 |
| 4 | 7 | Pale Red + Yellow | 2.1295 | 2.0346 | 6.9012 |
| 5 | 7 | Pale Green + Yellow | 2.8697 | 1.7687 | 4.4579 |
| 6 | 7 | Pale Blue + Yellow | 3.9054 | 1.6108 | 1.4522 |
| 4 | 3 | Pale Red + Deep Blue | 13.7953 | 7.9671 | 1.5650 |
| 7 | 3 | Yellow + Deep Blue | 21.3027 | 8.4927 | 3.4470 |

TABLE 8

GREIGE DATA: White

| $X_o$ | $Y_o$ | $Z_o$ | $K_{ox}$ | $K_{oy}$ | $K_{oz}$ |
|---|---|---|---|---|---|
| 65.14 | 69.16 | 70.41 | 0.0933 | 0.0688 | 0.0622 |

TABLE 9

DYES TO BLEND: Pale Red + Pale Green + Pale Blue + Yellow

| Dye No. | $K_x$ | $K_y$ | $K_z$ | $S_x$ | $S_y$ | $S_z$ |
|---|---|---|---|---|---|---|
| 4 | 1.8067 | 2.0707 | 3.1958 | 1.6599 | 1.4389 | 1.2618 |
| 5 | 2.3385 | 1.9950 | 4.1897 | 0.9957 | 0.9260 | 1.0124 |
| 6 | 3.0687 | 2.4645 | 1.7175 | 0.6789 | 0.6329 | 0.6966 |
| 7 | 0.8954 | 0.7291 | 3.2458 | 1.9394 | 1.3345 | 0.8841 |

TABLE 10

| DYE NUMBERS | $K_{IJX}$ | $K_{IJY}$ | $K_{IJZ}$ |
|---|---|---|---|
| 4 + 5 | 3.1668 | 2.6439 | 4.5439 |
| 4 + 6 | 7.2048 | 5.1524 | 2.1763 |
| 5 + 6 | 4.3949 | 3.2950 | 1.5603 |
| 4 + 7 | 2.1295 | 2.0346 | 6.9012 |
| 5 + 7 | 2.8697 | 1.7687 | 4.4579 |
| 6 + 7 | 3.9054 | 1.6108 | 1.4522 |

TABLE 11
BLEND COLOR

| $C_1$ | $C_2$ | $C_3$ | $C_4$ | $(K/S)_x$ | $(K/S)_y$ | $(K/S)_z$ | X | Y | Z |
|---|---|---|---|---|---|---|---|---|---|
| 0.0 | 0.0 | 0.0 | 0.0 | 0.0933 | 0.0688 | 0.0622 | 65.14 | 69.16 | 70.41 |
| 0.0 | 0.0 | 0.0 | 0.1 | 0.1531 | 0.1250 | 0.3553 | 57.89 | 60.96 | 44.05 |
| 0.0 | 0.0 | 0.1 | 0.2 | 0.4515 | 0.3708 | 0.7318 | 39.94 | 43.32 | 31.79 |
| 0.0 | 0.1 | 0.2 | 0.3 | 0.8903 | 0.7382 | 1.3617 | 28.62 | 31.65 | 22.22 |
| 0.1 | 0.2 | 0.3 | 0.4 | 1.4276 | 1.2311 | 2.1626 | 21.55 | 23.67 | 16.23 |
| 0.2 | 0.3 | 0.4 | 0.3 | 1.9326 | 1.6794 | 2.4965 | 17.58 | 19.36 | 14.61 |
| 0.3 | 0.4 | 0.3 | 0.2 | 1.9366 | 1.7309 | 2.6033 | 17.55 | 18.97 | 14.15 |
| 0.4 | 0.3 | 0.2 | 0.1 | 1.6098 | 1.4929 | 2.2185 | 19.92 | 20.94 | 15.93 |
| 0.3 | 0.2 | 0.1 | 0.0 | 1.0787 | 1.0205 | 1.4538 | 25.63 | 26.48 | 21.30 |
| 0.2 | 0.1 | 0.0 | 0.0 | 0.5252 | 0.5327 | 0.8948 | 37.36 | 37.12 | 28.54 |
| 0.1 | 0.0 | 0.0 | 0.0 | 0.2349 | 0.2411 | 0.3390 | 51.03 | 50.60 | 44.85 |

TABLE 12
CRT MEASUREMENTS

| R | G | B | Y | x | y |
|---|---|---|---|---|---|
| 255 | 0 | 0 | 23.30 | 0.630 | 0.336 |
| 225 | 0 | 0 | 17.30 | 0.630 | 0.336 |
| 200 | 0 | 0 | 13.00 | 0.630 | 0.336 |
| 150 | 0 | 0 | 6.35 | 0.630 | 0.336 |
| 100 | 0 | 0 | 2.28 | 0.628 | 0.336 |
| 50 | 0 | 0 | 0.36 | 0.611 | 0.335 |
| 0 | 255 | 0 | 75.50 | 0.270 | 0.608 |
| 0 | 225 | 0 | 56.00 | 0.270 | 0.609 |
| 0 | 200 | 0 | 42.50 | 0.271 | 0.609 |
| 0 | 150 | 0 | 21.30 | 0.272 | 0.609 |
| 0 | 100 | 0 | 7.88 | 0.272 | 0.609 |
| 0 | 50 | 0 | 1.30 | 0.273 | 0.602 |
| 0 | 40 | 0 | 0.71 | 0.273 | 0.596 |
| 0 | 30 | 0 | 0.32 | 0.273 | 0.578 |
| 0 | 0 | 255 | 9.50 | 0.143 | 0.057 |
| 0 | 0 | 225 | 7.10 | 0.143 | 0.057 |
| 0 | 0 | 200 | 5.35 | 0.143 | 0.057 |
| 0 | 0 | 150 | 2.67 | 0.143 | 0.057 |
| 0 | 0 | 100 | 0.97 | 0.143 | 0.058 |
| 0 | 0 | 80 | 0.55 | 0.143 | 0.058 |
| 0 | 0 | 60 | 0.26 | 0.144 | 0.060 |

High Resolution Sony ® Monitor using a Minolta ® CA-100

TABLE 13
COMPUTED CRT MODEL PARAMETERS

|  | gamma | gain | offset |
|---|---|---|---|
| R | 2.25 | −0.0384 | 0.7297 |
| G | 2.25 | −0.0327 | 0.9134 |
| B | 2.25 | −0.0579 | 1.1958 |

TABLE 14
COMPUTED CRT MODEL PARAMETERS $$M = \begin{vmatrix} 1.0017 & 0.4450 & 0.1787 \\ 0.5343 & 1.0018 & 0.0712 \\ 0.0541 & 0.1996 & 0.9996 \end{vmatrix}$$

What is claimed is:

1. A process for measuring XYZ values of colorant blends of a sample with an image digitizer and converting to RGB values for reproduction on an electronic display comprising the steps of:

(a) measuring XYZ values of said sample in an uncolored condition with said image digitizer;

(b) measuring XYZ values of said sample having a single colorant denoted as i thereon at a plurality of concentrations of said colorant with said image digitizer;

(c) measuring XYZ values of said sample having a pair of colorants denoted as i and j thereon at said plurality of concentration of said colorants i and j with said image digitizer;

(d) computing $K_o$ of said sample in uncolored condition by the following formula:

K = Light absorbing coefficient for said sample
S = Light scattering coefficient for said sample
$K_o$ = Light absorbing coefficient for said sample in uncolored condition
$R_o$ = Said XYZ values of said sample in an uncolored condition with scaled values less than 1
Subscript $_o$ = Zero colorant concentration
$(K/S)_o = K_o = (1 - R_o)^2 / 2R_o$;

(e) computing $K_i$ and $S_i$ for each single colorant denoted as i by the following formulas:

$(K/S)_i = (1 - R_i)^2 / 2R_i$
$R_i$ = Said XYZ values of said sample having said single colorant i thereon at said plurality of concentrations of said colorant i with scaled values less than 1
$y = (K/S)_i - K_o$
y = Dependent variable
$x_1 = C_i$
$C_i$ = Concentration of said colorant i
$x_1$ = First independent variable
$x_2 = (K/S)_i C_i$
$x_2$ = Second independent variable
$w = (R_i / (R_o - R_i)^2)^2$
w = Least squares weight that forces relative errors to be uniform
q = Different color concentrations
P = Total number of different color concentrations $$K_i = \frac{-\sum_{q=1}^{P}(w_q x_{2q}^2) \sum_{q=1}^{P}(w_q x_{1q} y_q) + \sum_{q=1}^{P}(w_q x_{1q} x_{2q}) \sum_{q=1}^{P}(w_q x_{2q} y_q)}{-\sum_{q=1}^{P}(w_q x_{1q}^2) \sum_{q=1}^{P}(w_q x_{2q}^2) + \sum_{q=1}^{P}(w_q x_{1q} x_{2q})^2}$$

$K_i$ = Light absorption coefficient for said colorant i $$S_i = \frac{-\sum_{q=1}^{P}(w_q x_{1q} x_{2q}) \sum_{q=1}^{P}(w_q x_{1q} y_q) + \sum_{q=1}^{P}(w_q x_{1q}^2) \sum_{q=1}^{P}(w_q x_{2q} y_q)}{-\sum_{q=1}^{P}(w_q x_{1q}^2) \sum_{q=1}^{P}(w_q x_{2q}^2) + \sum_{q=1}^{P}(w_q x_{1q} x_{2q})^2}$$

$S_i$ = Light scattering coefficient for said colorant i;

(f) computing $K_{ij}$ for each said pair of colorants denoted as i and j by the following formulas:

$(K/S)_{ij} = (1 - R_{ij})^2 / 2R_{ij}$
$R_{ij}$ = Said XYZ values of said sample having said pair of colorants i and j thereon at said plurality of concentrations of said colorants i and j with scaled values less than 1
$y = (1 + S_i C_i + S_j C_j)(K/S)_{ij} - (K_o + K_i C_i + K_j C_j)$ $C_j$ = Concentration of said colorant j
$x = C_i C_j$
$W = (R_{ij}/(R_o - R_{ij})^2)^2$ $$K_{ij} = \frac{\sum_{q=1}^{P}(w_q x_q y_q)}{\sum_{q=1}^{P}(w_q x_q^2)}$$

$K_{ij}$ = Light absorption coefficient for said colorants i and j

Index q refers to different colorant concentrations with a letter P designating the total thereof;

(g) utilizing computed $K_o$, $K_i$, $S_i$, and $K_{ij}$ values to compute XYZ tristimulus color values from the following formulas with a letter N designating the total number of colorants:

$$\left(\frac{K}{S}\right)_{ij} = \frac{K_o + \sum_{i=1}^{N} K_i C_i + \sum_{i=1}^{N}\sum_{j=1}^{N} K_{ij} C_i C_j}{1 + \sum_{i=1}^{N} S_i C_i}$$

$R_{ij} = (1+(K/S)_{ij}) - [(1+(K/S)_{ij})^2 - 1]^{\frac{1}{2}}$;

(h) converting said computed XYZ tristimulus color values to RGB values;
(i) storing said RGB values on a computer; and
(j) reproducing said RGB values on an electronic display.

2. A process for reproducing colorant blends on an electronic display as defined in claim 1, wherein said sample is a textile material.

3. A process for reproducing colorant blends on an electronic display as defined in claim 2, wherein said textile material is carpeting.

4. A process for reproducing colorant blends on an electronic display as defined in claim 1, wherein said sample is paper and colorants.

5. A process for reproducing colorant blends on an electronic display as defined in claim 1, wherein said electronic display is a cathode ray tube.

6. A process for reproducing colorant blends on an electronic display as defined in claim 1, wherein said electronic display is a liquid crystal display.

7. A process for reproducing colorant blends on an electronic display as defined in claim 1, wherein said electronic display is a electroluminiscent display.

8. A process for reproducing colorant blends on an electronic display as defined in claim 1, wherein said electronic display is a plasma display.

9. A process for measuring XYZ values of colorant blends of a sample with a colorimeter and converting to RGB values for reproduction on an electronic display comprising the steps of:

(a) measuring XYZ values of said sample in an uncolored condition with said colorimeter;
(b) measuring XYZ values of said sample having a single colorant denoted as i thereon at a plurality of concentrations of said colorant i with said colorimeter;
(c) measuring XYZ values of said sample having a pair of colorants denoted as i and j thereon at said plurality of concentrations of said colorants i and j with said colorimeter;
(d) computing $K_o$ of said sample in uncolored condition by the following the formula:
K = Light absorbing coefficient for said sample S = Light scattering coefficient for said sample
$K_o$ = Light absorbing coefficient for said sample in uncolored condition
$R_o$ = Said XYZ values of said sample in an uncolored condition with scaled values less than 1
Subscript $_o$ = Zero colorant concentration
$(K/S)_o = K_o = (1-R_o)^2/2R_o$;

(e) computing $K_i$ and $S_i$ for each single colorant denoted as i by the following formulas:
$(K/S)_i = (1-R_i)^2/2R_i$
$R_i$ = Said XYZ values of said sample having said single colorant i thereon at said plurality of concentrations of said colorant i with scaled values less than 1
$y = (K/S)_i - K_o$
y = Dependent variable
$x_1 = C_i$
$C_i$ = Concentration of said colorant i
$x_1$ = First independent variable
$x_2 = (K/S)_i C_i$
$x_2$ = Second independent variable
$w = (R_i/R_o - R_i)^2)^2$
w = Least squares weight that forces relative errors to be uniform
q = Different color concentrations
P = Total number of different color concentrations $$K_i = \frac{-\sum_{q=1}^{P}(w_q x_{2q}^2)\sum_{q=1}^{P}(w_q x_{1q} y_q) + \sum_{q=1}^{P}(w_q x_{1q} x_{2q})\sum_{q=1}^{P}(w_q x_{2q} y_q)}{-\sum_{q=1}^{P}(w_q x_{1q}^2)\sum_{q=1}^{P}(w_q x_{2q}^2) + \sum_{q=1}^{P}(w_q x_{1q} x_{2q})^2}$$

$K_i$ = Light absorption coefficient for said colorant i $$S_i = \frac{-\sum_{q=1}^{P}(w_q x_{1q} x_{2q})\sum_{q=1}^{P}(w_q x_{1q} y_q) + \sum_{q=1}^{P}(w_q x_{1q}^2)\sum_{q=1}^{P}(w_q x_{2q} y_q)}{-\sum_{q=1}^{P}(w_q x_{1q}^2)\sum_{q=1}^{P}(w_q x_{2q}^2) + \sum_{q=1}^{P}(w_q x_{1q} x_{2q})^2}$$

$S_i$ = Light scattering coefficient for said colorant i;

(f) computing $K_{ij}$ for each said pair of colorants denoted as i and j by the following formulas:
$(K/S)_{ij} = (1-R_{ij})^2/2R_{ij}$
$R_{ij}$ = Said XYZ values of said sample having said pair of colorants i and j thereon at said plurality of concentrations of said colorants i and j with scaled values less than 1
$y = (1 + S_i C_i + S_j C_j)(K/S)_{ij} - (K_o + K_i C_i + K_j C_j)$
$C_j$ = Concentration of said colorant j
$x = C_i C_j$
$w = (R_{ij}/(R_o - R_{ij})^2)^2$ $$K_{ij} = \frac{\sum_{q=1}^{P}(w_q x_q y_q)}{\sum_{q=1}^{P}(w_q x_q^2)}$$

$K_{ij}$ = Light absorption coefficient for said colorants i and j

Index q refers to different colorant concentrations with a letter P designating the total thereof;

(g) utilizing computed $K_o$, $K_i$, $S_i$, and $K_{ij}$ values to compute XYZ tristimulus color values from the following formulas with a letter N designating the total number of colorants:

$$\left(\frac{K}{S}\right)_{ij} = \frac{K_o + \sum_{i=1}^{N} K_i C_i + \sum_{i=1}^{N}\sum_{j=1}^{N} K_{ij} C_i C_j}{1 + \sum_{i=1}^{N} S_i C_i}$$

$R_{ij} = (1+(K/S)_{ij}) - [(1+(K/S)_{ij})^2 - 1]^{\frac{1}{2}}$;

(h) converting said computed XYZ tristimulus color values to RGB values;

(i) storing said RGB values on a computer; and (j) reproducing said RGB values on an electronic display.

10. A process for reproducing colorant blends on an electronic display as defined in claim 9, wherein said sample is a textile material.

11. A process for reproducing colorant blends on an electronic display as defined in claim 10, wherein said textile material is carpeting.

12. A process for reproducing colorant blends on an electronic display as defined in claim 9, wherein said sample is paper and colorants.

13. A process for reproducing colorant blends on an electronic display as defined in claim 9, wherein said electronic display is a cathode ray tube.

14. A process for reproducing colorant blends on an electronic display as defined in claim 9, wherein said electronic display is a liquid crystal display.

15. A process for reproducing colorant blends on an electronic display as defined in claim 9, wherein said electronic display is a electroluminiscent display.

16. A process for reproducing colorant blends on an electronic display as defined in claim 9, wherein said electronic display is a plasma display.

17. A process for measuring XYZ values of colorant blends of a sample with a chroma meter and converting to RGB values for reproduction on an electronic display comprising the steps of:

(a) measuring XYZ values of said sample in an uncolored condition with said chroma meter;

(b) measuring XYZ values of said sample having a single colorant denoted as i thereon at a plurality of concentrations of said colorant i with said chroma meter;

(c) measuring XYZ values of said sample having a pair of colorants denoted as i and j thereon at said plurality of concentrations of said colorants i and j with said chroma meter;

(d) computing $K_o$ of said sample in uncolored condition by the following formula:

K = Light absorbing coefficient for said sample

S = Light scattering coefficient for said sample $K_o$ = Light absorbing coefficient for said sample in uncolored condition $R_o$ = Said XYZ values of said sample in an uncolored condition with scaled values less than 1

Subscript $_o$ = Zero colorant concentration $(K/S)_o = K_o = (1-R_o)^2/2R_o$;

(e) computing $K_i$ and $S_i$ for each single colorant denoted as i by the following formulas:

$(K/S)_i = (1-R_i)^2/2R_i$ $R_i$ = Said XYZ values of said sample having said single colorant i thereon at said plurality of concentrations of said colorant i with scaled values less than 1

$y = (K/S)_i - K_o$ y = Dependent variable $x_1 = C_i$ $C_i$ = Concentration of said colorant i $x_1$ = First independent variable $x_2 = (K/S)_i C_i$ $X_2$ = Second independent variable $w = (R_o/(R_o - R_i)^2)^2$ w = Least squares weight that forces relative errors to be uniform q = Different color concentrations P = Total number of different color concentrations $$K_i = \frac{-\sum_{q=1}^{P}(w_q x_{2q}^2)\sum_{q=1}^{P}(w_q x_{1q} y_q) + \sum_{q=1}^{P}(w_q x_{1q} x_{2q})\sum_{q=1}^{P}(w_q x_{2q} y_q)}{-\sum_{q=1}^{P}(w_q x_{1q}^2)\sum_{q=1}^{P}(w_q x_{2q}^2) + \sum_{q=1}^{P}(w_q x_{1q} x_{2q})^2}$$

$K_i$ = Light absorption coefficient for said colorant i $$S_i = \frac{-\sum_{q=1}^{P}(w_q x_{1q} x_{2q})\sum_{q=1}^{P}(w_q x_{1q} y_q) + \sum_{q=1}^{P}(w_q x_{1q}^2)\sum_{q=1}^{P}(w_q x_{2q} y_q)}{-\sum_{q=1}^{P}(w_q x_{1q}^2)\sum_{q=1}^{P}(w_q x_{2q}^2) + \sum_{q=1}^{P}(w_q x_{1q} x_{2q})^2}$$

$S_i$ = Light scattering coefficient for said colorant i;

(f) computing $K_{ij}$ for each said pair of colorants denoted as i and j by the following formulas:

$(K/S)_{ij} = (1-R_{ij})^2/2R_{ij}$ $R_{ij}$ = Said XYZ values of said sample having said pair of colorants i and j thereon at said plurality of concentrations of said colorants i and j with scaled values less than 1

$y = (1 + S_i C_i + S_j C_j)(K/S)_{ij} - (K_o + K_i C_i + K_j C_j)$ $C_j$ = Concentration of said colorant j $x = C_i C_j$ $w = (R_{ij}/(R_o - R_{ij})^2)^2$ $$K_{ij} = \frac{\sum_{q=1}^{P}(w_q x_q y_q)}{\sum_{q=1}^{P}(w_q x_q^2)}$$

$K_{ij}$ = Light absorption coefficient for said colorants i and j

Index q refers to different colorant concentrations with a letter P designating the total thereof;

(g) utilizing computed $K_o$, $K_i$, $S_i$, and $K_{ij}$ values to compute XYZ tristimulus color values from the following formulas with a letter N designating the total number of colorants:

$$\left(\frac{K}{S}\right)_{ij} = \frac{K_o + \sum_{i=1}^{N} K_i C_i + \sum_{i=1}^{N}\sum_{j=1}^{N} K_{ij} C_i C_j}{1 + \sum_{i=1}^{N} S_i C_i}$$

$R_{ij} = (1+(K/S)_{ij}) - [(1+(K/S)_{ij})^2 - 1]^{\frac{1}{2}}$;

(h) converting said computed XYZ tristimulus color values to RGB values;
(i) storing said RGB values on a computer; and
(j) reproducing said RGB values on an electronic display.

18. A process for reproducing colorant blends on an electronic display as defined in claim 17, wherein said sample is a textile material.

19. A process for reproducing colorant blends on an electronic display as defined in claim 18, wherein said textile material is carpeting.

20. A process for reproducing colorant blends on an electronic display as defined in claim 17, wherein said sample is paper and colorants.

21. A process for reproducing colorant blends on an electronic display as defined in claim 17, wherein said electronic display is a cathode ray tube.

22. A process for reproducing colorant blends on an electronic display as defined in claim 17, wherein said electronic display is a liquid crystal display.

23. A process for reproducing colorant blends on an electronic display as defined in claim 17, wherein said electronic display is a electroluminiscent display.

24. A process for reproducing colorant blends on an electronic display as defined in claim 17, wherein said electronic display is a plasma display.

25. A process for measuring XYZ values of colorant blends of a sample with a spectrophotometer and converting to RGB values for reproduction on an electronic display comprising the steps of:

(a) measuring XYZ values of said sample in an uncolored condition with said spectrophotometer;
(b) measuring XYZ values of said sample having a single colorant denoted as i thereon at a plurality of concentrations of said colorant i with said spectrophotometer;
(c) measuring XYZ values of said sample having a pair of colorants denoted as i and j thereon at said plurality of concentrations of said colorants i and j with said spectrophotometer;
(d) computing $K_o$ said sample in uncolored condition by the following formula:
K=Light absorbing coefficient for said sample
S=Light scattering coefficient for said sample
$K_o$=Light absorbing coefficient for said sample in uncolored condition
$R_o$=Said XYZ values of said sample in an uncolored condition with scaled values less than 1
Subscript $_o$=Zero colorant concentration
$(K/S)_o = K_o = (1-R_o)^2/2R_o$;

(e) computing $K_i$ and $S_i$ for each single colorant denoted as i by the following formulas:
$(K/S)_i = (1-R_i)^2/2R_i$
$R_i$=Said XYZ values of said sample having said single colorant i thereon at said plurality of concentrations of said colorant i with scaled values less than 1
$y = (K/S)_i - K_o$
y=Dependent variable
$x_1 = C_i$
$C_i$=Concentration of said colorant i
$x_1$=First independent variable
$x_2 = (K/S)_i C_i$
$x_2$=Second independent variable
$w = (R_i/(R_o - R_i)^2)^2$
w=Least squares weight that forces relative errors to be uniform q=Different color concentrations
P=Total number of different color concentrations $$K_i = \frac{-\sum_{q=1}^{P}(w_q x_{2q}^2) \sum_{q=1}^{P}(w_q x_{1q} y_q) + \sum_{q=1}^{P}(w_q x_{1q} x_{2q}) \sum_{q=1}^{P}(w_q x_{2q} y_q)}{-\sum_{q=1}^{P}(w_q x_{1q}^2) \sum_{q=1}^{P}(w_q x_{2q}^2) + \sum_{q=1}^{P}(w_q x_{1q} x_{2q})^2}$$

$K_i$=Light absorption coefficient for said colorant i $$S_i = \frac{-\sum_{q=1}^{P}(w_q x_{1q} x_{2q}) \sum_{q=1}^{P}(w_q x_{1q} y_q) + \sum_{q=1}^{P}(w_q x_{1q}^2) \sum_{q=1}^{P}(w_q x_{2q} y_q)}{-\sum_{q=1}^{P}(w_q x_{1q}^2) \sum_{q=1}^{P}(w_q x_{2q}^2) + \sum_{q=1}^{P}(w_q x_{1q} x_{2q})^2}$$

$S_i$=Light scattering coefficient for said colorant i;

(f) computing $K_{ij}$ for each said pair of colorants denoted as i and j by the following formulas:
$(K/S)_{ij} = (1-R_{ij})^2/2R_{ij}$
$R_{ij}$=Said XYZ values of said sample having said pair of colorants i and j thereon at said plurality of concentrations of said colorants i and j with scaled values less than 1
$y = (1 + S_i C_i + S_j C_j)(K/S)_{ij} - (K_o + K_i C_i + K_j C_j)$
$C_j$=Concentration of said colorant j
$x = C_i C_j$
$w = (R_{ij}/(R_o - R_{ij})^2)^2$ $$K_{ij} = \frac{\sum_{q=1}^{P}(w_q x_q y_q)}{\sum_{q=1}^{P}(w_q x_q^2)}$$

$K_{ij}$=Light absorption coefficient for said colorant i and j
Index q refers to different colorant concentrations with a letter P designating the total thereof;

(g) utilizing computed $K_o$, $K_i$, $S_i$, and $K_{ij}$ values to compute XYZ tristimulus color values from the following formulas with a letter N designating the total number of colorants:

$$\left(\frac{K}{S}\right)_{ij} = \frac{K_o + \sum_{i=1}^{N} K_i C_i + \sum_{i=1}^{N}\sum_{j=1}^{N} K_{ij} C_i C_j}{1 + \sum_{i=1}^{N} S_i C_i}$$

$R_{ij} = (1 + (K/S)_{ij}) - [(1 + (K/S)_{ij})^2 - 1]^{\frac{1}{2}}$;

(h) converting said computed XYZ tristimulus color values to RGB values;
(i) storing said RGB values on a computer; and
(j) reproducing said RGB values on an electronic display.

26. A process for reproducing colorant blends on an electronic display as defined in claim 25, wherein said sample is a textile material.

27. A process for reproducing colorant blends on an electronic display as defined in claim 26, wherein said textile material is carpeting.

28. A process for reproducing colorant blends on an electronic display as defined in claim 25, wherein said sample is paper and colorants.

29. A process for reproducing colorant blends on an electronic display as defined in claim 25, wherein said electronic display is a cathode ray tube.

30. A process for reproducing colorant blends on an electronic display as defined in claim 25, wherein said electronic display is a liquid crystal display.

31. A process for reproducing colorant blends on an electronic display as defined in claim 25, wherein said electronic display is a electroluminiscent display.

32. A process for reproducing colorant blends on an electronic display as defined in claim 25, herein said electronic display is a plasma display.

33. A system for measuring XYZ values of colorant blends of a sample with an image digitizer and converting to RGB values for reproduction on an electronic display comprising the steps of:

(a) means for measuring XYZ values of said sample in an uncolored condition with said image digitizer;

(b) means for measuring XYZ values of said sample having a single colorant denoted as i thereon at a plurality of concentrations of said colorant with said image digitizer;

(c) means for measuring XYZ values of said sample having a pair of colorants denoted as i and j thereon at said plurality of concentrations of said colorants i and j with said image digitizer;

(d) means for computing $K_o$ said sample in uncolored condition by the following formula:
K = Light absorbing coefficient for said sample
S = Light scattering coefficient for said sample
$K_o$ = Light absorbing coefficient for said sample in uncolored condition
$R_o$ = Said XYZ values of said sample in an uncolored condition with scaled values less than 1
Subscript $_o$ = Zero colorant concentration
$(K/S)_o = K_o = (1-R_o)^2/2R_o$;

(e) means for computing $K_i$ and $S_i$ for each single colorant denoted as i by the following formulas:
$(K/S)_i = (1-R_i)^2/2R_i$
$R_i$ = Said XYZ values of said sample having said single colorant i thereon at said plurality of concentrations of said colorant i with scaled values less than 1
$y = (K/S)_i - K_o$
y = Dependent variable
$x_1 = C_i$
$C_i$ = Concentration of said colorant i
$x_1$ = First independent variable
$x_2 = (K/S)_i C_i$
$x_2$ = Second independent variable
$w = (R_i/(R_o - R_i)^2)^2$
w = Least squares weight that forces relative errors to be uniform
q = Different color concentrations
P = Total number of different color concentrations $$K_i = \frac{-\sum_{q=1}^{P}(w_q x_{2q}^2)\sum_{q=1}^{P}(w_q x_{1q} y_q) + \sum_{q=1}^{P}(w_q x_{1q} x_{2q})\sum_{q=1}^{P}(w_q x_{2q} y_q)}{-\sum_{q=1}^{P}(w_q x_{1q}^2)\sum_{q=1}^{P}(w_q x_{2q}^2) + \sum_{q=1}^{P}(w_q x_{1q} x_{2q})^2}$$

$K_i$ = Light absorption coefficient for said colorant i $$S_i = \frac{-\sum_{q=1}^{P}(w_q x_{1q} x_{2q})\sum_{q=1}^{P}(w_q x_{1q} y_q) + \sum_{q=1}^{P}(w_q x_{1q}^2)\sum_{q=1}^{P}(w_q x_{2q} y_q)}{-\sum_{q=1}^{P}(w_q x_{1q}^2)\sum_{q=1}^{P}(w_q x_{2q}^2) + \sum_{q=1}^{P}(w_q x_{1q} x_{2q})^2}$$

$S_i$ = Light scattering coefficient for said colorant i;

(f) means for computing $K_{ij}$ for each pair of colorants denoted as i and j by the following formulas:
$(K/S)_{ij} = (1-R_{ij})^2/2R_{ij}$
$R_{ij}$ = Said XYZ values of said sample having said pair of colorants i and j thereon at said plurality of concentrations of said colorants i and j with scaled values less than 1
$y = (1 + S_i C_i + S_j C_j)(K/S)_{ij} - (K_o + K_i C_i + K_j C_j)$
$C_j$ = Concentration of said colorant j
$x = C_i C_j$
$w = (R_{ij}/(R_o - R_{ij})^2)^2$ $$K_{ij} = \frac{\sum_{q=1}^{P}(w_q x_q y_q)}{\sum_{q=1}^{P}(w_q x_q^2)}$$

$K_{ij}$ = Light absorption coefficient for said colorants i and j
Index q refers to different colorant concentrations with a letter P designating the total thereof;

(g) means for utilizing computed $K_o$, $K_i$, $S_i$, and $K_{ij}$ values to compute XYZ tristimulus color values from the following formulas with a letter N designating the total number of colorants:

$$\left(\frac{K}{S}\right)_{ij} = \frac{K_o + \sum_{i=1}^{N} K_i C_i + \sum_{i=1}^{N}\sum_{j=1}^{N} K_{ij} C_i C_j}{1 + \sum_{i=1}^{N} S_i C_i}$$

$R_{ij} = (1+(K/S)_{ij}) - [(1+(K/S)_{ij})^2 - 1]^{\frac{1}{2}}$;

(h) means for converting said computed XYZ tristimulus color values to RGB values;

(i) means for storing said RGB values on a computer; and (j) means for reproducing said RGB values on an electronic display.

34. A system for reproducing colorant blends on an electronic display as defined in claim 33, wherein said sample is a textile material.

35. A system for reproducing colorant blends on an electronic display as defined in claim 34, wherein said textile material is carpeting.

36. A system for reproducing colorant blends on an electronic display as defined in claim 33, wherein said sample is paper and colorants.

37. A system for reproducing colorant blends on an electronic display as defined in claim 33, wherein said electronic display is a cathode ray tube.

38. A system for reproducing colorant blends on an electronic display as defined in claim 33, wherein said electronic display is a liquid crystal display.

39. A system for reproducing colorant blends on an electronic display as defined in claim 33, wherein said electronic display is a electroluminiscent display.

40. A system for reproducing colorant blends on an electronic display as defined in claim 33, wherein said electronic display is a plasma display.

41. A system for measuring XYZ values of colorant blends of a sample with a colorimeter and converting to RGB values for reproduction on an electronic display comprising the steps of:

(a) means for measuring XYZ values of said sample in an uncolored condition with said colorimeter;

(b) means for measuring XYZ values of said sample having a single colorant denoted as i thereon at a plurality of concentrations of said colorant i with said colorimeter;

(c) means for measuring XYZ values of said sample having a pair of colorants denoted as i and j thereon at said plurality of concentrations of said colorants i and j with said colorimeter;

(d) means for computing $K_o$ of said sample in uncolored condition by the following formula:
K = Light absorbing coefficient for said sample
S = Light scattering coefficient for said sample
$K_o$ = Light absorbing coefficient for said sample in uncolored condition
$R_o$ = Said XYZ values of said sample in an uncolored condition with scaled values less than 1
Subscript $_o$ = Zero colorant concentration
$(K/S)_o = K_o = (1-R_o)^2/2R_o$;

(e) means for computing $K_i$ and $S_i$ for each single colorant denoted as i by the following formulas:
$(K/S)_i = (1-R_i)^2/2R_i$
$R_i$ = Said XYZ values of said sample having said single colorant i thereon at said plurality of concentrations of said colorant i with scaled values less than 1
$y = (K/S)_i - K_o$
y = Dependent variable
$x_1 = C_i$
$C_i$ = Concentration of said colorant i
$x_1$ = First independent variable
$x_2 = (K/S)_i C_i$
$x_2$ = Second independent variable
$w = (R_i/(R_o-R_i)^2)^2$
w = Least squares weight that forces relative errors to be uniform
q = Different color concentrations
P = Total number of difference color concentrations $$K_i = \frac{-\sum_{q=1}^{P}(w_q x_{2q}^2)\sum_{q=1}^{P}(w_q x_{1q} y_q) + \sum_{q=1}^{P}(w_q x_{1q} x_{2q})\sum_{q=1}^{P}(w_q x_{2q} y_q)}{-\sum_{q=1}^{P}(w_q x_{1q}^2)\sum_{q=1}^{P}(w_q x_{2q}^2) + \sum_{q=1}^{P}(w_q x_{1q} x_{2q})^2}$$

$K_i$ = Light absorption coefficient for said colorant i $$S_i = \frac{-\sum_{q=1}^{P}(w_q x_{1q} x_{2q})\sum_{q=1}^{P}(w_q x_{1q} y_q) + \sum_{q=1}^{P}(w_q x_{1q}^2)\sum_{q=1}^{P}(w_q x_{2q} y_q)}{-\sum_{q=1}^{P}(w_q x_{1q}^2)\sum_{q=1}^{P}(w_q x_{2q}^2) + \sum_{q=1}^{P}(w_q x_{1q} x_{2q})^2}$$

$S_i$ = Light scattering coefficient for said colorant i;

(f) means for computing $K_{ij}$ for each said pair of colorants denoted as i and j by the following formulas:
$(K/S)_{ij} = (1-R_{ij})^2/2R_{ij}$
$R_{ij}$ = Said XYZ values of said sample having said pair of colorants i and j thereon at said plurality of concentrations of said colorants i and j with scaled values less than 1
$y = (1+S_iC_i+S_jC_j)(K/S)_{ij} - (K_o+K_iC_i+K_jC_j)$
$C_j$ = Concentration of said colorant j
$x = C_i C_j$
$w = (R_{ij}/(R_o-R_{ij})^2)^2$ $$K_{ij} = \frac{\sum_{q=1}^{P}(w_q x_q y_q)}{\sum_{q=1}^{P}(w_q x_q^2)}$$

$K_{ij}$ = Light absorption coefficient for said colorants i and j
Index q refers to different colorant concentrations with a letter P designating the total thereof;

(g) means for utilizing computed $K_o$, $K_i$, $S_i$, and $K_{ij}$ values to compute XYZ tristimulus color values from the following formulas with a letter N designating the total number of colorants:

$$\left(\frac{K}{S}\right)_{ij} = \frac{K_o + \sum_{i=1}^{N} K_i C_i + \sum_{i=1}^{N}\sum_{j=1}^{N} K_{ij} C_i C_j}{1 + \sum_{i=1}^{N} S_i C_i}$$

$R_{ij} = (1+(K/S)_{ij}) - [(1+(K/S)_{ij})^2 - 1]^{\frac{1}{2}}$;

(h) means for converting said computed XYZ tristimulus color values to RGB values;

(i) means for storing said RGB values on a computer; and (j) means for reproducing said RGB values on an electronic display.

42. A system for reproducing colorant blends on an electronic display as defined in claim 41, wherein said sample is a textile material.

43. A system for reproducing colorant blends on an electronic display as defined in claim 42, wherein said textile material is carpeting.

44. A system for reproducing colorant blends on an electronic display as defined in claim 41, wherein said sample is paper and colorants.

45. A system for reproducing colorant blends on an electronic display as defined in claim 41, wherein said electronic display is a cathode ray tube.

46. A system for reproducing colorant blends on an electronic display as defined in claim 41, wherein said electronic display is a liquid crystal display.

47. A system for reproducing colorant blends on an electronic display as defined in claim 41, wherein said electronic display is a electroluminiscent display.

48. A system for reproducing colorant blends on an electronic display as defined in claim 41, wherein said electronic display is a plasma display.

49. A system for measuring XYZ values of colorant blends of a sample with a chroma meter and converting to RGB values for reproduction on an electronic display comprising the steps of:

(a) means for measuring XYZ values of said sample in an uncolored condition with said chroma meter;

(b) means for measuring XYZ values of said sample having a single colorant denoted as i thereon at a plurality of concentrations of said colorant i with said chroma meter;

(c) means for measuring XYZ values of said sample having a pair of colorants denoted as i and j thereon at said plurality of concentrations of said colorants i and j with said chroma meter;

(d) means for computing $K_o$ of said sample in uncolored condition by the following formula:
K=Light absorbing coefficient for said sample
S=Light scattering coefficient for said sample
$K_o$=Light absorbing coefficient for said sample in uncolored condition
$R_o$=Said XYZ values of said sample in an uncolored condition with scaled values less than 1
Subscript $_o$=Zero colorant concentration
$(K/S)_o = K_o = (1-R_o)^2/2R_o$;

(e) means for computing $K_i$ and $S_i$ for each single colorant denoted as i by the following formulas:
$(K/S)_i = (1-R_i)^2/2R_i$
$R_i$=Said XYZ values of said sample having said single colorant i thereon at said plurality of concentrations of said colorant i with scaled values less than 1
$y = (K/S)_i - K_o$
y=Dependent variable
$x_1 = C_i$
$C_i$=Concentration of said colorant i
$X_1$=First independent variable
$x_2 = (K/S)_i C_i$
$X_2$=Second independent variable
$w = (R_i/(R_o - R_i)^2)^2$
w=Least squares weight that forces relative errors to be uniform
q=Different color concentrations
P=Total number of different color concentrations $$K_i = \frac{-\sum_{q=1}^{P}(w_q x_{2q}^2)\sum_{q=1}^{P}(w_q x_{1q} y_q) + \sum_{q=1}^{P}(w_q x_{1q} x_{2q})\sum_{q=1}^{P}(w_q x_{2q} y_q)}{-\sum_{q=1}^{P}(w_q x_{1q}^2)\sum_{q=1}^{P}(w_q x_{2q}^2) + \sum_{q=1}^{P}(w_q x_{1q} x_{2q})^2}$$

$K_i$=Light absorption coefficient for said colorant i $$S_i = \frac{-\sum_{q=1}^{P}(w_q x_{1q} x_{2q})\sum_{q=1}^{P}(w_q x_{1q} y_q) + \sum_{q=1}^{P}(w_q x_{1q}^2)\sum_{q=1}^{P}(w_q x_{2q} y_q)}{-\sum_{q=1}^{P}(w_q x_{1q}^2)\sum_{q=1}^{P}(w_q x_{2q}^2) + \sum_{q=1}^{P}(w_q x_{1q} x_{2q})^2}$$

$S_i$=Light scattering coefficient for said colorant i;

(f) means for computing $K_{ij}$ for each said pair of colorants denoted as i and j by the following formulas:
$(K/S)_{ij} = (1-R_{ij})^2/2R_{ij}$
$R_{ij}$=Said XYZ values of said sample having said pair of colorants i and j thereon at said plurality of concentrations of said colorants i and j with scaled values less than 1
$y = (1 + S_i C_i + S_j C_j)(K/S)_{ij} - (K_o + K_i C_i + K_j C_j)$
$C_j$=Concentration of said colorant j
$x = C_i C_j$
$w = (R_{ij}/(R_o - R_{ij})^2)^2$ $$K_{ij} = \frac{\sum_{q=1}^{P}(w_q x_q y_q)}{\sum_{q=1}^{P}(w_q x_q^2)}$$

$K_{ij}$=Light absorption coefficient for said colorants i and j
Index q refers to different colorant concentrations with a letter P designating the total thereof;

(g) means for utilizing computed $K_o$, $K_i$, $S_i$, and $K_{ij}$ values to compute XYZ tristimulus color values from the following formulas with a letter N designating the total number of colorants:

$$\left(\frac{K}{S}\right)_{ij} = \frac{K_o + \sum_{i=1}^{N} K_i C_i + \sum_{i=1}^{N}\sum_{j=1}^{N} K_{ij} C_i C_j}{1 + \sum_{i=1}^{N} S_i C_i}$$

$R_{ij} = (1 + (K/S)_{ij}) - [(1 + (K/S)_{ij})^2 - 1]^{\frac{1}{2}}$;

(h) means for converting said computed XYZ tristimulus color values to RGB values;

(i) means for storing said RGB values on a computer; and (j) means for reproducing said RGB values on an electronic display.

50. A system for reproducing colorant blends on an electronic display as defined in claim 49, wherein said sample is a textile material.

51. A system for reproducing colorant blends on an electronic display as defined in claim 50, wherein said textile material is carpeting.

52. A system for reproducing colorant blends on an electronic display as defined in claim 49, wherein said sample is paper and colorants.

53. A system for reproducing colorant blends on an electronic display as defined in claim 49, wherein said electronic display is a cathode ray tube.

54. A system for reproducing colorant blends on an electronic display as defined in claim 49, wherein said electronic display is a liquid crystal display.

55. A system for reproducing colorant blends on an electronic display as defined in claim 49, wherein said electronic display is a electroluminiscent display.

56. A system for reproducing colorant blends on an electronic display as defined in claim 49, wherein said electronic display is a plasma display.

57. A system for measuring XYZ values of colorant blends of a sample with a spectrophotometer and converting to RGB values for reproduction on an electronic display comprising the steps of:

(a) means for measuring XYZ values of said sample in an uncolored condition with said spectrophotometer;

(b) means for measuring XYZ values of said sample having a single colorant denoted as i thereon at a plurality of concentrations of said colorant i with said spectrophotometer;

(c) means of measuring XYZ values of said sample having a pair of colorants denoted as i and j thereon at said plurality of concentrations of said colorants i and j with said spectrophotometer;

(d) means for computing $K_o$ of said sample in uncolored condition by the following formula:
K=Light absorbing coefficient for said sample
S=Light scattering coefficient for said sample $K_o$ = Light absorbing coefficient for said sample in uncolored condition $R_o$ = Said XYZ values of said sample in an uncolored condition with scaled values less than 1

Subscript $_o$ = Zero colorant concentration $(K/S)_o = K_o = (1-R_o)^2/2R_o;$ (e) means for computing $K_i$ and $S_i$ for each single colorant denoted as i by the following formulas:

$(K/S)_i = (1-R_i)^2/2R_i$ $R_i$ = Said XYZ values of said sample having said single colorant i thereon at said plurality of concentrations of said colorant i with scaled values less than 1

$y = (K/S)_i - K_o$ y = Dependent variable $x_1 = C_i$ $C_i$ = Concentration of said colorant i $x_1$ = First independent variable $x_2 = (K/S)_i C_i$ $x_2$ = Second independent variable $w = (R_i/(R_o - R_i)^2)^2$ w = Least squares weight that forces relative errors to be uniform q = Different color concentrations P = Total number of different color concentrations $$K_i = \frac{-\sum_{q=1}^{P}(w_q x_{2q}^2) \sum_{q=1}^{P}(w_q x_{1q} y_q) + \sum_{q=1}^{P}(w_q x_{1q} x_{2q}) \sum_{q=1}^{P}(w_q x_{2q} y_q)}{-\sum_{q=1}^{P}(w_q x_{1q}^2) \sum_{q=1}^{P}(w_q x_{2q}^2) + \sum_{q=1}^{P}(w_q x_{1q} x_{2q})^2}$$

$K_i$ = Light absorption coefficient for said colorant i $$S_i = \frac{-\sum_{q=1}^{P}(w_q x_{1q} x_{2q}) \sum_{q=1}^{P}(w_q x_{1q} y_q) + \sum_{q=1}^{P}(w_q x_{1q}^2) \sum_{q=1}^{P}(w_q x_{2q} y_q)}{-\sum_{q=1}^{P}(w_q x_{1q}^2) \sum_{q=1}^{P}(w_q x_{2q}^2) + \sum_{q=1}^{P}(w_q x_{1q} x_{2q})^2}$$

$S_i$ = Light scattering coefficient for said colorant i;

(f) means for computing $K_{ij}$ for each said pair of colorants denoted as i and j by the following formulas:

$(K/S)_{ij} = (1-R_{ij})^2/2R_{ij}$ $R_{ij}$ = Said XYZ values of said sample having said pair of colorants i and j thereon at said plurality of concentrations of said colorants i and j with scaled values less than 1

$y = (1 + S_i C_i + S_j C_j)(K/S)_{ij} - (K_o + K_i C_i + K_j C_j)$ $C_j$ = Concentration of said colorant j $x = c_i C_j$ $w = (R_{ij}/(R_o - R_{ij})^2)^2$ $$K_{ij} = \frac{\sum_{q=1}^{P}(w_q x_q y_q)}{\sum_{q=1}^{P}(w_q x_q^2)}$$

$K_{ij}$ = Light absorption coefficient for said colorants i and j

Index q refers to different colorant concentrations with a letter P designating the total thereof;

(g) means for utilizing computed $K_o$, $K_i$, $S_i$, and $K_{ij}$ values to compute XYZ tristimulus color values from the following formulas with a letter N designating the total number of colorants:

$$\left(\frac{K}{S}\right)_{ij} = \frac{K_o + \sum_{i=1}^{N} K_i C_i + \sum_{i=1}^{N}\sum_{j=1}^{N} K_{ij} C_i C_j}{1 + \sum_{i=1}^{N} S_i C_i}$$

$R_{ij} = (1+(K/S)_{ij}) - [(1+(K/S)_{ij})^2 - 1]^{\frac{1}{2}};$ (h) means for converting said computed XYZ tristimulus color values to RGB values;

(i) means for storing said RGB values on a computer; and (j) means for reproducing said RGB values on an electronic display.

58. A system for reproducing colorant blends on an electronic display as defined in claim 57, wherein said sample is a textile material.

59. A system for reproducing colorant blends on an electronic display as defined in claim 58, wherein said textile material is carpeting.

60. A system for reproducing colorant blends on an electronic display as defined in claim 57, wherein said sample is paper and colorant.

61. A system for reproducing colorant blends on an electronic display as defined in claim 57, wherein said electronic display is a cathode ray tube.

62. A system for reproducing colorant blends on an electronic display as defined in claim 57, wherein said electronic display is a liquid crystal display.

63. A system for reproducing colorant blends on an electronic display as defined in claim 57, wherein said electronic display is a electroluminiscent display.

64. A system for reproducing colorant blends on an electronic display as defined in claim 57, wherein said electronic display is a plasma display.

* * * * *